United States Patent [19]
Margulis et al.

[11] Patent Number: 6,157,396
[45] Date of Patent: Dec. 5, 2000

[54] SYSTEM AND METHOD FOR USING BITSTREAM INFORMATION TO PROCESS IMAGES FOR USE IN DIGITAL DISPLAY SYSTEMS

[75] Inventors: Neal Margulis, Woodside, Calif.; Chad Fogg, Seattle, Wash.

[73] Assignee: Pixonics LLC, Woodside, Calif.

[21] Appl. No.: 09/250,424

[22] Filed: Feb. 16, 1999

[51] Int. Cl.[7] .................................................. G06T 1/20
[52] U.S. Cl. .......................................... 345/506; 345/202
[58] Field of Search .................................... 345/501, 502, 345/506, 507–509, 512, 202; 348/625, 630, 631

[56] References Cited

U.S. PATENT DOCUMENTS

| | | | |
|---|---|---|---|
| 5,092,671 | 3/1992 | Van Os | 353/31 |
| 5,329,368 | 7/1994 | Plotke | 348/701 |
| 5,341,174 | 8/1994 | Xue et al. | 348/576 |
| 5,369,432 | 11/1994 | Kennedy | 348/181 |
| 5,420,787 | 5/1995 | Gawne et al. | 382/207 |
| 5,426,471 | 6/1995 | Tanaka et al. | 348/745 |
| 5,548,327 | 8/1996 | Gunday et al. | 348/97 |
| 5,559,676 | 9/1996 | Gessaman | 361/752 |
| 5,577,191 | 11/1996 | Bonomi | 395/502 |
| 5,657,402 | 8/1997 | Bender et al. | 382/284 |
| 5,719,594 | 2/1998 | Potu | 345/430 |
| 5,737,019 | 4/1998 | Kim | 348/390 |
| 5,754,260 | 5/1998 | Ooi et al. | 349/10 |
| 5,808,695 | 9/1998 | Rosser et al. | 348/584 |

OTHER PUBLICATIONS

Foley, Van Dam, Feiner, Hughes: Computer Graphics Principals and Practice; 1990; pp. 155–165, 564–567, 822–834; Addison Wesley.

Patrick Candry; Projection Systems: Display Systems; 1997; pp. 237–256; John Wiley and Sons.

Charles McLaughlin, Dave Armitage; Prospects for Microdisplay Based Rear Projection; 1996.

Snell & Wilcox; Kudos NRS500 Online Product Guide; pp. 1–2.

Snell & Wilcox; Kudos NRS30 Online Product Guide; pp. 1–2.

Pixelworks; PW364 Image Processor Data Sheet; www.pixelworksinc.com/products/364datasheet.html.

Faroudja Labs; VP401 On Line Product Overview; Jul. 28, 1998.

Faroudja Labs: VS50 On Line Product Overview; Jul. 28, 1998.

Darim: M–Filter Product Overview; 1997; pp. 1–4.

D. W. Parker; The Dynamic Performance of CRT and LC Displays; Getting the Best from State–of–the–Art Display Systems; Feb. 21–23, 1995; London, UK; Society for Information Display.

*Primary Examiner*—Kee M. Tung
*Attorney, Agent, or Firm*—Wells, St. John, Roberts, Gregory & Matkin P.S.

[57] ABSTRACT

An image processing system using bitstream information for enhancing visual display quality. The processing system retains I frames and some P or B frames from a standard MPEG-2 bitstream, and stores the information across multiple Groups of Pictures (GOPs). The system uses prediction block information in conjunction with detected object edges and bitstream vector information to analyze object optical flow and to reconstruct high quality image frames. The system can also utilize supplemental bitstream information such as layer coding, instructional cues, and image key meta data to further improve the quality of the image frames and for special system functions. When an input image does not include MPEG-2 motion vector bitstream information, the system uses techniques such as optical flow, block matching, or Pel-recursion to estimate motion that tracks the image object motion.

30 Claims, 11 Drawing Sheets

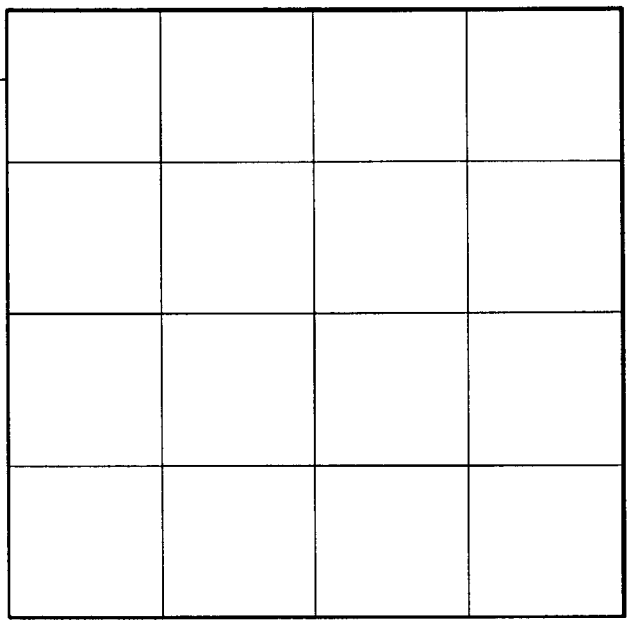
FIG. 8B
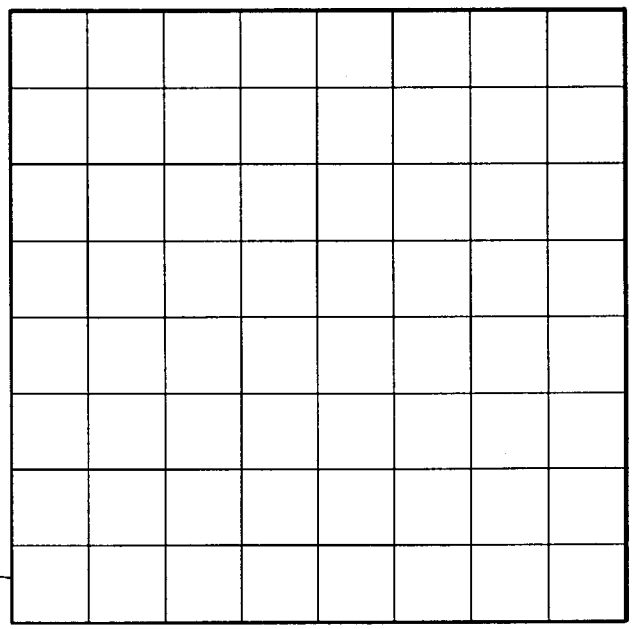

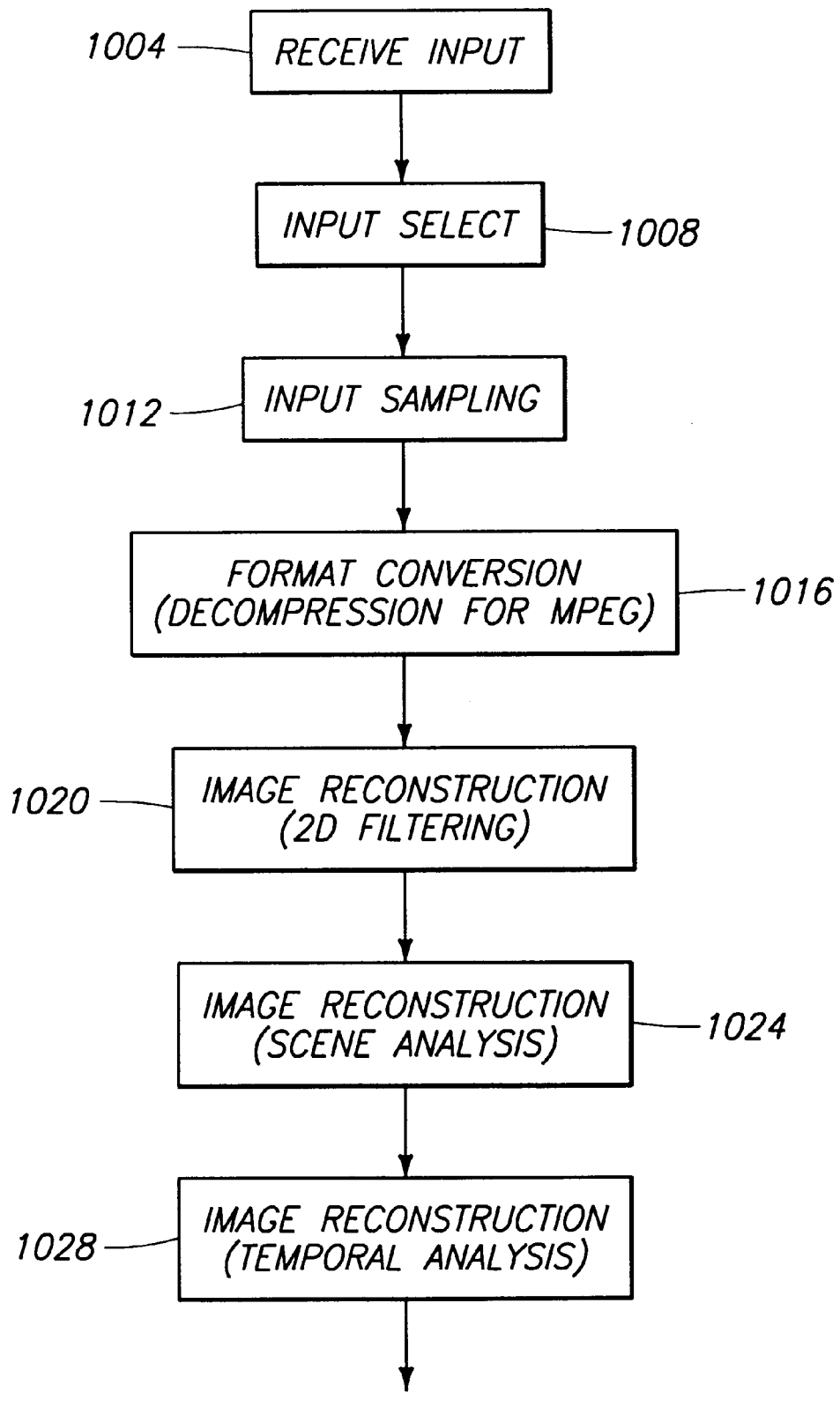

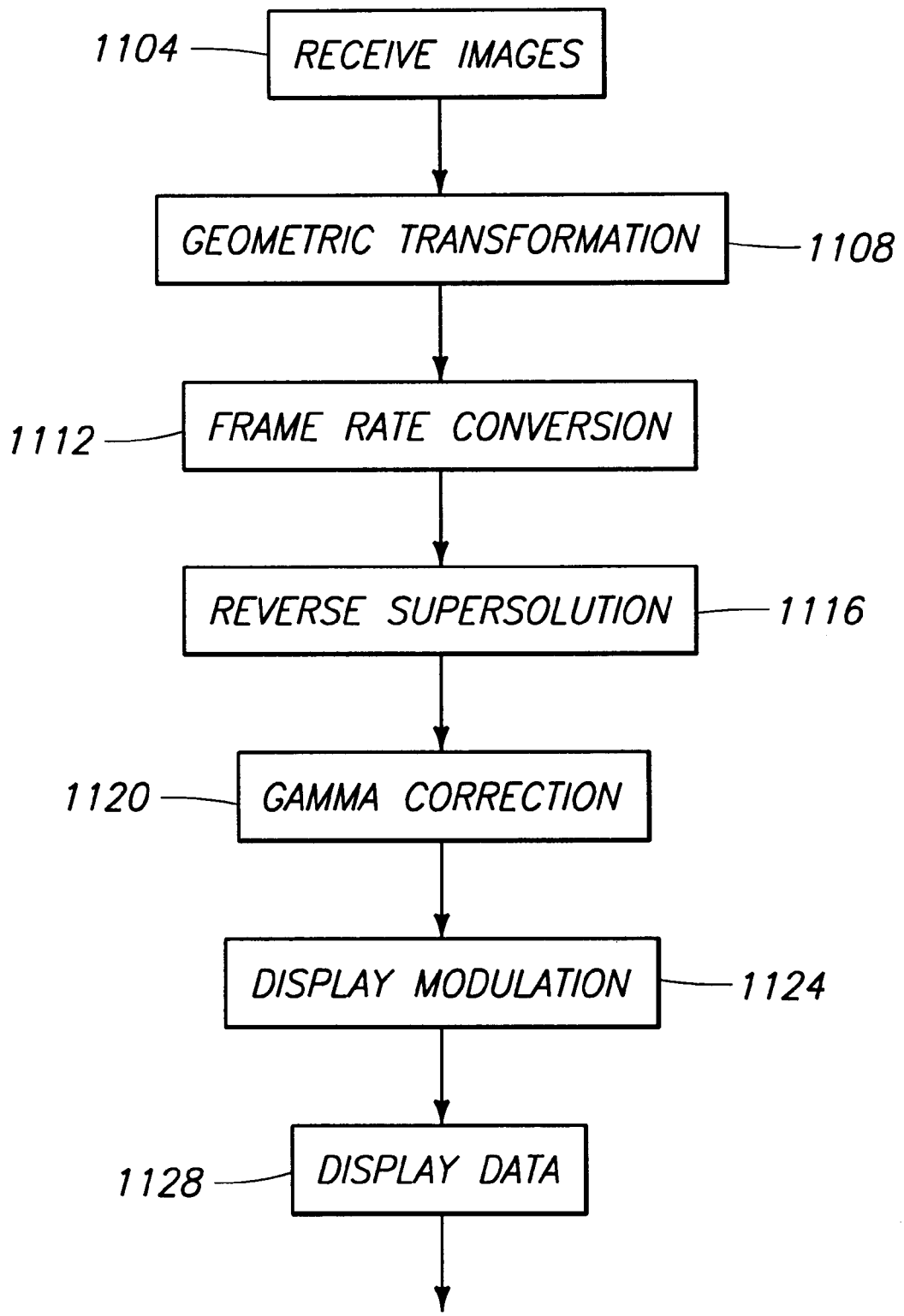

SYSTEM AND METHOD FOR USING BITSTREAM INFORMATION TO PROCESS IMAGES FOR USE IN DIGITAL DISPLAY SYSTEMS

BACKGROUND OF THE INVENTION

1. Field of the Invention

The present invention relates generally to digital image display systems and more particularly to using bitstream information to process images for optimizing appearance quality.

2. Discussion of Prior Art

Cathode Ray Tubes (CRTs), including conventional televisions and computer monitors, are analog devices which scan an electron beam across a phosphor screen to produce an image. Digital image processing products that enhance display graphics and video on CRTs have been increasingly available because CRTs can associate with many different input and output data formats. Further, CRTs can display moving images with high quality screen brightness and response. However, CRTs have considerable limitations in applications such as portable flat screen displays where size and power are important. Additionally, as direct view CRT display size increases, achieving high quality completely across the display becomes more difficult and expensive.

Many recent portable and desktop systems include digital displays using liquid crystal displays (LCDs), a term which generally describes flat-panel display technologies and in particular active matrix liquid crystals displays (AMLCDs), silicon reflective LCDs (si-RLCDs), ferroelectric displays (FLCs), field emission displays (FEDs), electroluminescent displays (ELDs), plasma displays (PDs), and digital mirror displays (DMDs).

Compared to traditional CRT displays LCDs have the advantages of being smaller and lighter, consuming less power, and having discrete display elements, which can provide consistent images across the entire display. However, manufacturing LCDs requires special processing steps to achieve acceptable visual quality. Further, large screen direct view LCDs are expensive, and LCDs usually require a display memory.

Both CRT and LCD technologies can provide economical projection system large screen displays. CRT-based projection systems usually require three CRTs and three projection tubes, one for each of the Red (R), Green (G), and Blue (B) color components. Each tube must produce the full resolution display output at an acceptable brightness level, which makes the tubes expensive. Achieving proper tolerances for mechanical components in projection systems, including alignment hardware and lenses, is also expensive. Consequently, manufacturing CRT-based projection systems is costly. Since CRTs are analog, applying digital image processing techniques to CRT-based systems usually requires a frame buffer memory to effectively represent the digital image data.

Projection display systems also use transmissive or reflective LCD "microdisplay" technologies. Achieving the desired full color gamut in LCD-based parallel color projection systems, as in CRT-based projection systems, uses three separate LCD image modulators, one for each of the R, G, and B color components. A single LCD image modulator which produces R, G, and B either through spatial color filters or with sequential color fields at a sufficiently high rate can provide a low cost system.

FIG. 1 shows a prior art projection system 150 that includes a light system 100, mirrors 102, 104, 106, and 108, transmissive image modulators 110, 112, and 114, dichroic recombiners 116 and 118, and a projection lens 120. Light system 100 includes an illumination source such as a xenon lamp and a reflector system (not shown) for focusing light.

Mirrors 102, 104, 106, and 108, together with other components (not shown) constitute a separation subsystem that separates the light system 100 output white light beam into color components Red (R), Green (G), and Blue (B). The separation subsystem can also use prisms, including x-cube dichroic prism pairs or polarizing beam splitters.

Each image modulator 110, 112, and 114 receives a corresponding separated R, G, or B color component and functions as an active, full resolution, monochrome light valve that, according to the desired output images, modulates light intensities for the respective R, G, or B color component. Each image modulator 102, 104, and 106 can include a buffer memory and associated digital processing unit (not shown). A projection system may use only one image modulator which is responsible for all three color components, but the three image modulator system 150 provides better chromaticity and is more efficient.

Dichroic recombiners 116 and 118 combine modulated R, G, and B color components to provide color images to projection lens 120, which focuses and projects images onto a screen (not shown).

FIG. 1 system 150 can use transmissive light valve technology which passes light on axis 1002 through an LCD shutter matrix (not shown). Alternatively, system 150 can use reflective light valve technology (referred to as reflective displays) which reflects light off of digital display mirror display (DMD) image modulators 110, 112, and 114. Because each image modulator 110, 112, and 114 functions as an active, full resolution, monochrome light valve that modulates the corresponding color component, system 150 requires significant buffer memory and digital image processing capability.

Because of inherent differences in the physical responses of CRT and LCD materials, LCD-based projection and direct view display systems both have different flicker characteristics and exhibit different motion artifacts than CRT-based display systems. Additionally, an intense short pulse depends on the properties of CRT phosphors to excite a CRT pixel whereas a constant external light source is intensity modulated during the frame period of an LCD display. Further, LCDs switch in the finite time it takes to change the state of a pixel. Active matrix thin film transistor (TFT) displays, which have an active transistor controlling each display pixel, still require a switching time related to the LCD material composition and thickness, and the techniques of switching.

Most LCD-based image modulators (110, 112, 114, etc.) are addressed in raster scan fashion and require refreshing each pixel during each display frame interval. Accordingly, every output pixel is written to the display during every refresh cycle regardless of whether the value of the pixel has changed since the last cycle. In contrast, active matrix display technologies and some plasma display panel technologies allow random access to the display pixels. Other, simpler panels use a simpler row by row addressing scheme similar to the raster scan of a CRT. Additionally, some displays have internal storage to enable output frames to self-refresh based on residual data from the previous output frame.

Field Emission Displays (FEDs) may include thousands of microtips grouped in several tens of mesh cells for each pixel. The field emission cathodes in FEDs can directly address sets of row or column electrodes in FEDs, and FEDs have fast response times. FEDs can use external mesh addressing for better resolution images, but this requires increased input/output (I/O) bandwidth outside of the FED.

Opto-mechanical systems can provide uniform brightness and high chromaticity for high quality displays. Additionally, high quality projection lens systems can provide bright and uniform images. However, component and assembly tolerances in opto-mechanical systems can result in system imperfections including imprecise image modulator alignment and geometric lens distortion.

Commercially available digital image processing systems, usually a part of an electronic control subsystem, can process analog or digital input data and format the data into higher resolution output modes. These processing systems typically perform operations such as de-interlacing and line doubling or quadrupling for interlaced analog input data. Some systems include a decompression engine for decompressing compressed digital data, and input data scaling to match the resolution and aspect ratio to the display device. However, these systems do not perform advanced image processing specific to a digital imaging LCD or to the display system. Additionally, these digital image processing systems do not often accommodate digital or compressed digital image data which can include bitstream information for enhanced outputs.

Image sensing algorithms, for example in remote sensing and computer vision applications, use special sampling and image warping techniques to correct input sensor distortions and to reconstruct images.

Data compression tools such as those standardized by the Moving Pictures Experts Group (MPEG) can compact video data prior to transmission and reconstruct it upon reception. MPEG-2 can be applied to both standard definition television (SDTV) and high definition television (HDTV). An MPEG-2 bitstream follows a system specification that typically includes an audio stream, a video stream, a system stream and any number of other private streams. The video portion of a standard MPEG-2 bit stream includes I, P and B frames each containing a slice of macroblock descriptions. I frames are base frames and do not include motion information. Frames from one I frame to the next I frame are called a Group Of Pictures (GOP). P and B frames include motion vectors that describe the X-Y direction and the amount of movement for the marcoblocks from one frame to another. A motion vector thus indicates motion of a macroblock. Since an exact match is often not found, the macroblock information also includes prediction blocks that indicate how the new blocks differ from the original blocks. The macroblocks, as part of the input bitstream, are coded using a discrete cosine transform (DCT), which both simplifies the coding and compresses the macroblocks. A standard decoder decompresses macroblocks starting from base I frame, the decoded (inverse DCT) macroblock, the error terms associated with the macroblock, and the motion vector information, and then renders the output frame. This standard decoder also discards the frame information as each output frame of the GOP is rendered.

Although not part of the MPEG-2 specification, the MPEG-2 framework allows the bitstream to include supplemental information that can be used to produce higher quality output images.

Projecting an image from a projector on a tabletop to a flat screen which is closer to the projector at the bottom than the top results in an image which is narrower at the bottom than at the top in which is known as the "Keystone" effect.

Radial distortion occurs when an image pixel is displaced from its ideal position along a radial axis of the image. Because an image has the largest field angles in the display corners, the corners exhibit worse radial distortion than other display areas. Radial distortion includes barrel distortion, where image magnification decreases towards the corners, and pin cushion distortion, where the magnification increases towards the corners. Lens related distortions including radial distortion can cause image deformation. Distortion can also result from non-flat screens or earth's magnetic field.

Image modulators (110, 112, 114, etc.) have a fixed number of pixels spaced uniformly in a pattern. Projecting an image from an image modulator to a display screen deforms the uniformity of pixel spacing, that is, pixels are not correlated one to one from the image modulator to the display screen. Therefore, some screen display regions have more image modulator pixels than screen pixels while other screen display regions have fewer image modulator pixels than screen pixels.

Motion artifacts appear where image objects move near the edges of curved screens. Even when a flat screen projection is motion-adaptive filtered, the difference in the distances of objects from the camera causes an apparent motion of moving objects on a curved screen. Additionally, extremely large curved screens can achieve necessary resolution and brightness only with film projectors.

Multiple camera systems are commonly used to improve display quality on curved screen displays. For example, two cameras record respective halves of a scene to improve output. A layered coding technique may include a standard MPEG-2 stream as a base layer and enhancement information as a supplemental layer. Even if the two views are from slightly different angles, the compression ratio for the two camera views combined is less than the total compression ratio would be if each view were captured and compressed independently. Additionally, the second camera can provide a view that may be occluded from the first camera. Systems using additional camera angles for different views can provide additional coded and compressed data for later use. Multiple camera systems can also compensate for the limited focal depth of a single camera and can substituted for the use of a depth finding sensor which senses and records depth information for scenes. Image processing can improve the outputs of multiple camera systems.

Stereoscopic photography also uses multi-camera systems in which a first camera records a left eye view and a second camera records a right eye view. Because camera lenses focus at a certain distance, one camera uses one focal plane for all objects in a scene. A multi-camera system can use multiple cameras each to capture a different focal plane of a single scene. This effectively increases the focal depth. Digital image processing can further improve focusing for these multi-camera systems.

Types of three dimensional binocular display systems include analyph displays, frame sequence displays, autostereoscopic displays, single and multi-turn helix displays. These normally have multiple camera data channels. Analyph systems usually require a user to wear red and green glasses so that each eye perceives a different view. Frame sequencing systems use shutter glasses to separate left and right views. Autostereoscopic displays use lenticular lenses and holographic optical elements. Single or multi-turn helix displays use multiple semi-transparent display screen which can be seen by multiple observers without special glasses. Multiple camera data channels systems can benefit from image processing.

Each R, G, and B color component has different intensity values which are digitally represented by a number of bits. For example, if 8 bits represent each R, G, and B color component then each component has 256 ($=2^8$) intensity values from 0 to 255. Changing intensity value of a color component in an ideal digital device from a number X, for example, to a number Y, takes just as long whatever the Y value. Consequently, changing a color component value from 2 to 3 takes as long as changing the value from 2 to 200. However, because of the nature of LCD image modulator pixels, the transitions for modulating light intensities are not purely digital, and various analog distortions remain.

What is needed is an image processing system to enhance display quality and provide the best possible visual images.

SUMMARY OF THE INVENTION

The present invention provides an image processing system for enhancing visual quality and improving performance in digital display systems. The processing system, useful for DTV displays and electronic theaters, can receive different types of data inputs including analog, digital, and compressed (or coded) bitstream display images. The processing system analyzes bitstream information and uses motion compensation to produce output frames. The processing system retains I frames that start Groups Of Pictures (GOPs) and some P or B frames in a standard MPEG-2 bitstream, and stores across multiple GOPs both the Discrete Cosine Transform (DCT) frequency domain information and the spatial domain information to later track, and thus recognize, image flow. The system also uses prediction block information in conjunction with detected object edges and the bitstream vector information to analyze object optical flow and reconstruct the highest quality image frames.

The system can retrieve and interpret supplemental information coded in the bitstream which may include a layered coding video stream, instructional cues on how to best interpret the video streams, or an image key meta data stream. The system uses this supplemental information, either alone or in conjunction with MPEG-2 motion vector information, to track image flow. The system compares groups of pixels from one image field to those of subsequent and previous image fields to correlate image motion. The system then records the detected motion relative to the field position so that, together with input frame information and motion information, the system can later generate motion-compensated image output frames. The supplemental information is also used for special system functions such as object enhancement or replacement. Where an image does not include MPEG-2 motion vector bitstream information, the system preferably uses techniques such as optical flow, block matching, or Pel-recursion to estimate motion that tracks the image objection motion.

The processing system also uses known information to provide unique enhancements to the image modulator and to the display system. The processing system takes into account manufacturing defects, calibration data, environmental effects, and user controlled setup information.

BRIEF DESCRIPTION OF THE DRAWINGS

FIG. 8 shows an image having an 8×8 pixel resolution and a display having a 4×4 pixel resolution;

FIG. 10 is a flowchart illustrating DIP 210's image processing; and

FIG. 11 is a flowchart illustrating DOP 230's image processing.

DETAILED DESCRIPTION OF THE PREFERRED EMBODIMENTS

The present invention provides an image processing system which digitally processes one or more input data for output to a digital image modulator or to a digital memory from which a display device retrieves data.

Figure 1:
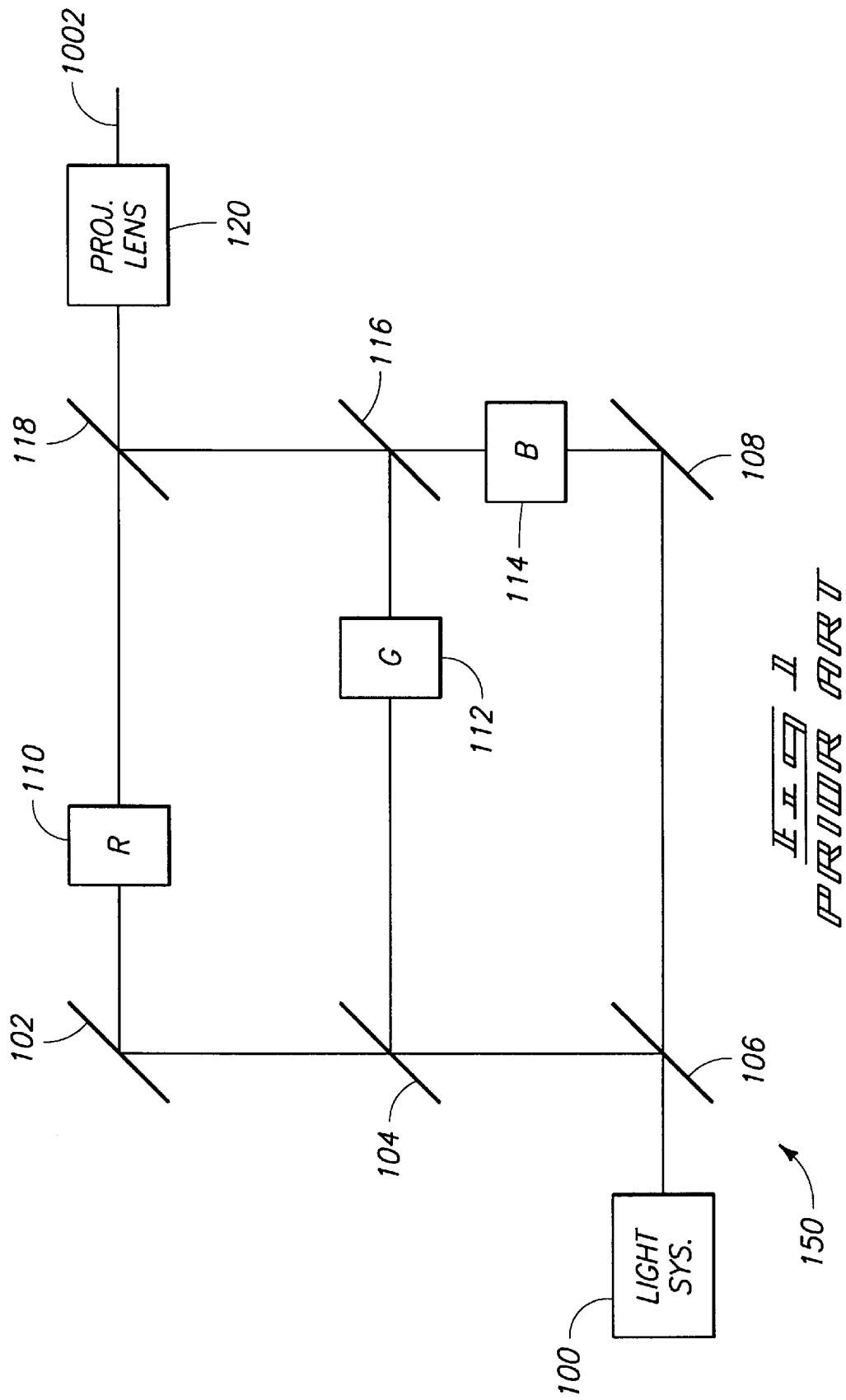
FIG. 1 is a block diagram of a prior art projection display system using three transmissive LCD imaging elements.
Figure 2:
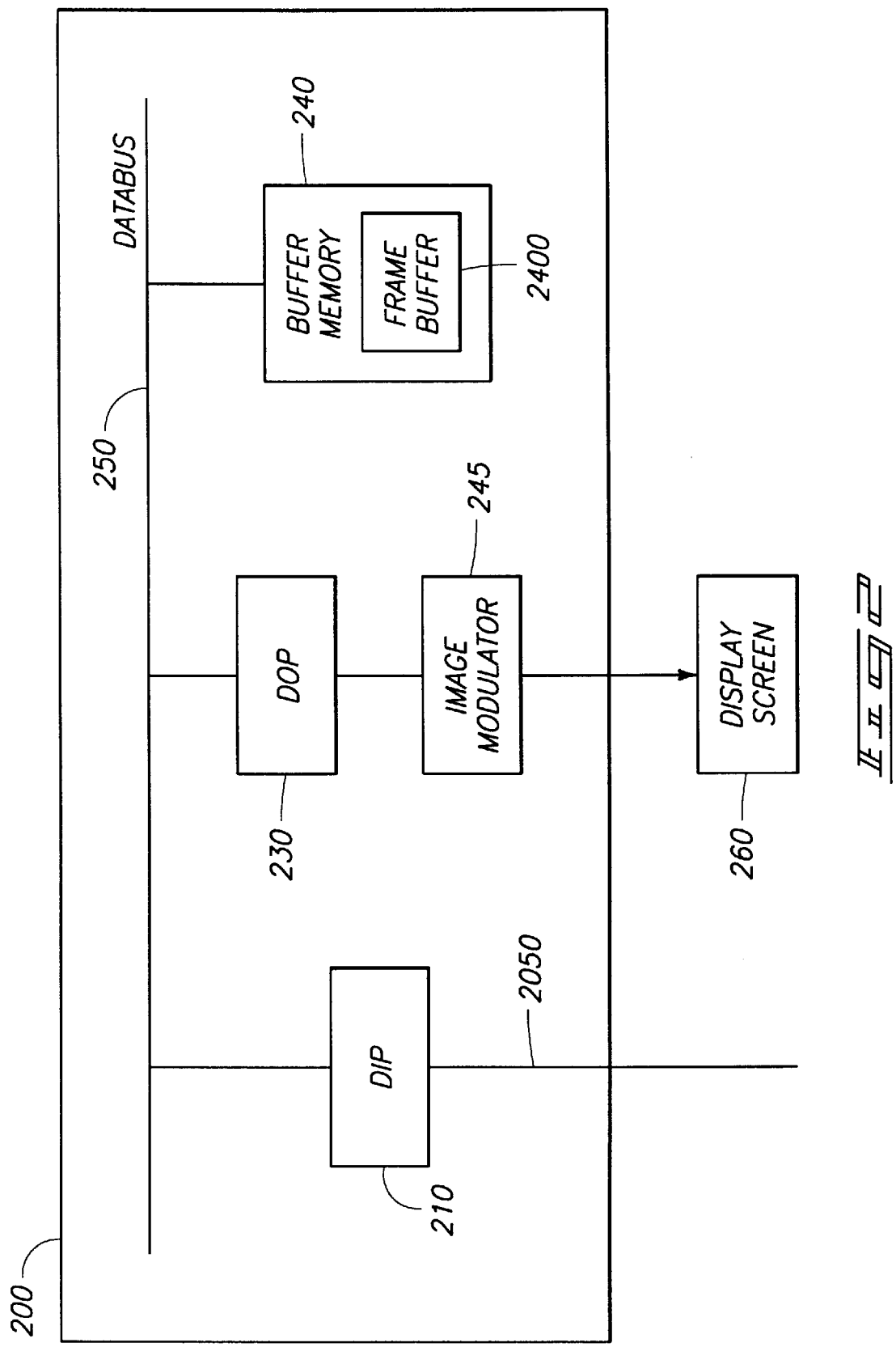
FIG. 2 is a block diagram of an image processing system in accordance with the invention.

FIG. 2 shows an image processing system 200 which includes a Display Input Processor (DIP) 210, a Display Output Processor (DOP) 230, and a buffer memory 240, all coupled to a databus 250. System 200 also includes an image modulator 245 coupled to DOP 230 and to an external display screen 260. DIP 210 preferably receives images on line 2050 and reconstructs the images both spatially and temporally. DIP 210 outputs are processed by DOP 230 to enhance image visual quality. DOP 230 outputs, preferably in frame format, are stored in frame buffer 2400 which is part of buffer memory 240. Buffer memory 240 stores data for use by DIP 210 and DOP 230. Frame buffer 2400, which stores image data for outputting to image modulator 245 or to a digital memory (not shown), is preferably part of buffer memory 240, but alternatively can be part of the digital memory, which can in turn be part of buffer memory 240.

Image modulator 245 can be CRT- or LCD-based direct view, displaying images on display screen 260. However, if image modulator 245 is part of a projection system then image modulator 245 provides images to be projected and enlarged onto display screen 260. If DOP 230 outputs are stored in a digital memory, a display device (not shown) retrieves data from the digital memory for display.

System 200 processes image data in a high-resolution internal format to preserve detailed image information because such information can be lost in each of the various image processing steps if the internal image format has lower resolution than the output of image modulator 245. System 200, for example, can assume that the processed image has four times (doubled vertically and horizontally) better pixel resolution than the (spatial resolution) output of image modulator 245.

Figure 3:
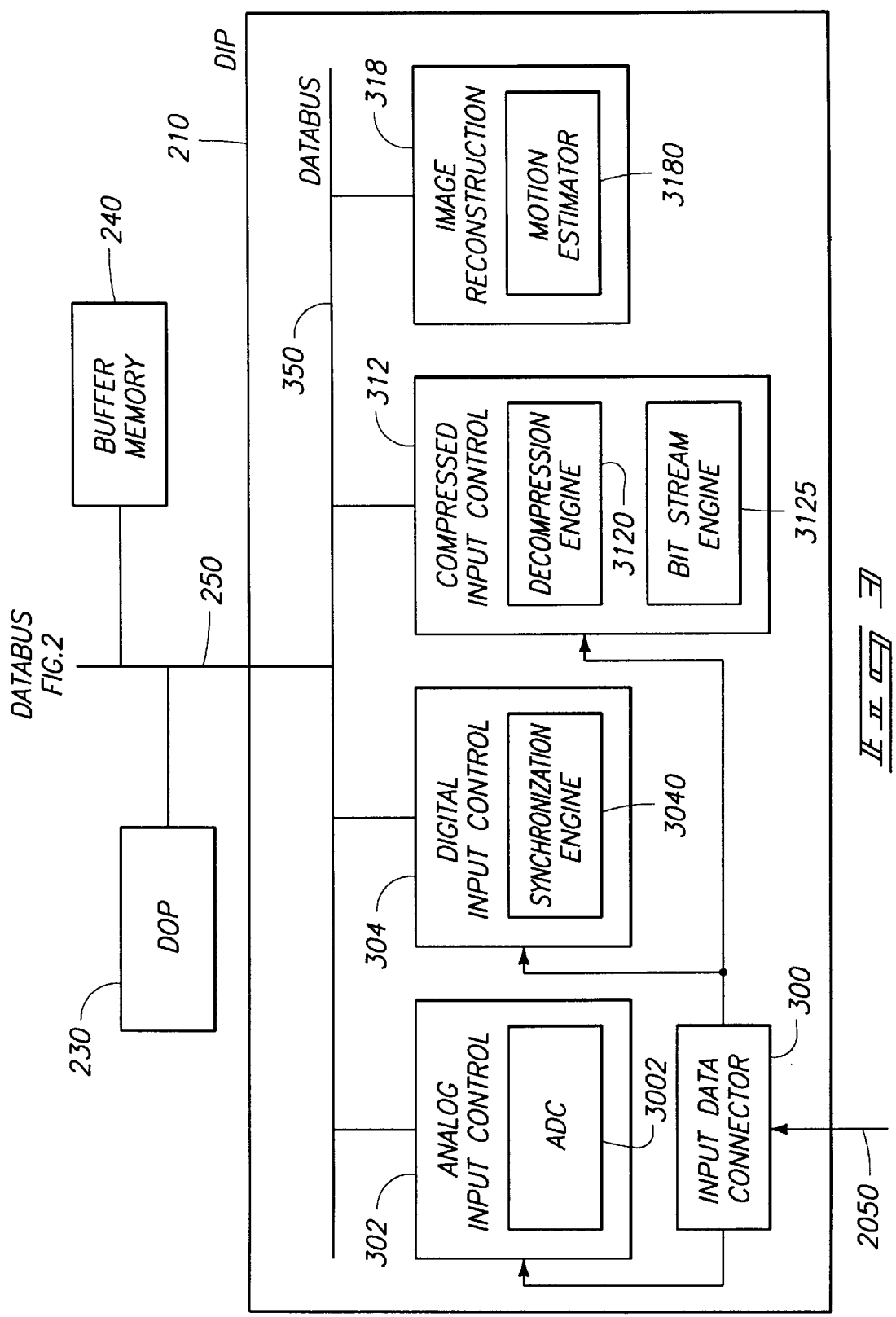
FIG. 3 is a block diagram of FIG. 2 DIP 210.

FIG. 3 is a block diagram of FIG. 2 DIP 210, including image processing modules Analog Input Control 302, Digital Input Control 304, Compressed Input Control 312, and Image Reconstruction (IR) 318, all connected to a databus 350. DIP 210 also includes one or more input data connectors 300 for receiving on line 2050 image data input to system 200, which can be one or more of analog video, digital video, non-tuned data, graphics data, or compressed data. Analog or digital video data may be in a native video format such as composite video, S-video, or some component YUV/YCrCb. Non-tuned data, receiving from a broadcast delivery system that may have many channels on a common carrier, may require a tuner included in or separate from DIP 210 so that relevant data can be turned from the channels. Compressed data may be in MPEG-2 format, which includes video and audio content, and the data containing control or video overlay information for DOP 230. Image data on line 2050 may be encrypted for security and thus require decryption by DIP 210. Accompanying the image data, DIP 210 also receives control data including for example, selected inputs, data types, vertical blanking interval (VBI) data, overlay channel information for the on-screen display (OSD), etc., and provides this control data to DOP 230. Each of the image processing modules, Analog Input Control 302, Digital Input Control 304, and Compressed Input Control 312, preferably receives image data from connector 300. A system microcontroller (not shown) preferably uses user-selected input controls to select image data, which is appropriately processed by each of modules 302, 304, and 312, and then preferably stored in buffer memory 240. The system microcontroller also uses the user input commands to control windowing for picture-in-picture displays, OSD information, and other system windowing capabilities.

DIP 210 preferably processes images in RGB formats. However, if applicable, for example, when the UV vectors are the same as the Y vector, DIP 210 processes images in YUV formats. In this example DIP 210 requires three times less processing power and the saved power can be applied to per pixel processing.

Analog Input Control 302 preferably includes an analog-to-digital converter (ADC) 3002, which samples the analog data inputs and produces digital data outputs. ADC 3002, to achieve high quality, samples its input data frequently and precisely enough that the image can be reconstructed from the sampled data points. For example, if an analog input signal is Red, Green, and Blue having data for an 800×600 resolution screen that is being refreshed at 70 Hz, then the data rate for each channel is approximately 50 MHz. Consequently, ADC 3002, to properly sample the input for image reconstruction, runs at 100 MHz. ADC 3002 preferably uses Nyquist sampling to determine the appropriate sampling rate.

Digital Input Control 304 preferably includes a synchronization engine 3040 and processes digital data, which may be in a YUV video or a digital RBG format. Since the data is already in digital format, Digital Input Control 304 does not include an ADC. Digital Input Control 304 also uses high-speed digital data transmittal techniques that are described in the Institute of Electrical and Electronics Engineering (IEEE) standard 1394, Low Voltage Differential Signaling (LVDS), and Panel Link. These standards include line termination, voltage control, data formatting, phase lock loops (PLLs), and data recovery to assure that Digital Input Control 304 properly receives the digital data input.

Compressed Input Control 312, preferably including a decompression engine 3120 and a Bitstream Engine 3125, processes compressed data that usually includes audio, video, and system information. DIP 210, via Compressed Input Control 312, preferably receives compressed data because transmitting non-compressed high-speed digital data outside of FIG. 2 system 200 is difficult and can be expensive in the cabling and component design. Further, current high speed digital interfaces are not fast enough to perform all of the panel-related processing in a separate system that requires a cable interface to a high resolution and high quality display system. Compressed Input Control 312, prior to decompression by decompression engine 3120, preferably demodulates the compressed digital data. Alternatively, a preprocessing system (not shown) may demodulate the data and provide it to Compressed Input Control 312. Compressed Input Control 312, performing additional steps such as error correction, assures that it properly receives the data and that the data is not corrupted. If the data is corrupted, Compressed Input Control 312 may conceal the corruption or request that the data be retransmitted. Compressed Input Control 312, once having correctly received the data, de-multiplexes the data into audio, video, and system streams, and provides the audio streams to an audio subsystem (not shown) for decoding and playback. Compressed Input Control 312 decompresses an encoded bitstream input, but retains relevant motion vector information for DOP 230 processing. Compressed Input Control 312 does not render output frames as part of a decompression process (as in a standard MPEG-2 decoder). In contrast, according to the invention, Decompression Engine 3120, Bitstream 3125, and IR 318 process the input bitstream, and DOP 230 produces output frames.

Compressed Input Control 312 retains the I frame that starts the GOP and some P or B frames in a standard MPEG-2 bitstream, and stores across multiple GOPs both the DCT frequency domain information preserved by Bitstream Engine 3125 and the spatial domain data produced by Decompression Engine 3120 and reconstructed by IR 318. Preserving the information from numerous video frames allows Bitstream Engine 3125 to later track image video paths over several frame periods. This is because Bitstream 3125 can analyze the bitstream vectors and then use edge detection algorithms to find objects within the DCT blocks. Bitstream Engine 3125 then uses the tracked video paths and the prediction block information to recognize image objects. The invention is thus advantageous over prior art standard MPEG-2 decoders because the invention uses the frame information in the bitstream while standard decoders would discard the information as each output frame of the GOP is rendered.

Bitstream Engine 3125 optimizes reconstruction of MPEG-2 input bitstreams into enhanced video frames in a manner that has not been used in prior art video enhancement products. The bitstream information picture and sequence header flags can be used as control data to optimize presentation for a particular display. Lower-layer coded data can reveal object shapes and other information that can be exploited to provide enhanced spatial and temporal rendering of blocks constituting images. Decompression engine 3120, its decoding engine (not shown), and IR 318 can use the bitstream information, for example, to better track, and thereby produce higher quality, moving objects.

For standard video bitstreams that do not include supplemental information, Bitstream Engine 3125 uses the image blocks (or macroblocks) of the MPEG-2 data. Since most video frames within a sequence are highly correlated, Bitstream Engine 3125 exploits this correlation to improve rendering. Bitstream Engine 3125 also employs motion estimation techniques for predicting motion compensation as a method of temporal processing across image frames. Bitstream Engine 3125 preferably uses a block-based prediction scheme to compare the coefficients from one frame to another and to look for similar coefficient data that has been shifted. Bitstream Engine 3125 can track the flow of video data prescribed by the prediction blocks belonging to the macroblocks within the bitstream, rather than re-estimating motion or creating the macroblocks similarly to a second pass encoding process. Bitstream Engine 3125 tracks the prediction blocks over several frames in which the temporal path of the prediction blocks delineates a coarse trajectory of moving objects. This coarse trajectory can be refined by additional motion estimation and bitstream processing. The motion vector of the prediction blocks includes a horizontal component and a vertical component. Bitstream Engine 3125 preserves the motion vector information for later use in generating DOP 230 output frames in conjunction with motion compensated temporal filtering and reverse super-resolution.

Bitstream engine 3125 utilizes the MPEG-2 motion vector and macroblock boundary information to perform a special coordinate based filtering that has not been used in prior art techniques. By knowing the locations of the block boundary edges from the motion vector and macroblock boundary, IR 318 can sharpen images within the block boundary. Further, IR 318 uses the same motion vector and block boundary information to determine on an individual pixel basis the appropriate filtering technique. In general a sharpening filter measures the value differences between nearby pixels and based on a threshold value will further increase the difference. Conversely a softening filter measures the value differences between nearby pixels and based on a threshold value will decrease the difference. The threshold value can either be static or in the case of adaptive filtering, can dynamically change based on the data values. Bitstream engine 3125 constructs a special post decompression filter map from the coded input stream so that IR 318 can apply sharpening filters to non-boundary data and smoothing filters to block boundary data. The filter map contains the coordinate information for the macroblocks for each output frame. The filter map is constructed by using the motion vector information where a motion vector contains the X and Y coordinates of a corner of an output macroblock. The coordinates of the corner of each macroblock, combined with the information on the height and width of the macroblocks, allow construction of a complete filter map for use by the IR. IR 318 thus both sharpens the block data to improve the image detial and filters artifacts of block boundary edges that may have been introduced during the MPEG-2 compression process. Consequently, the invention is advantageous over standard prior art techniques in which the decoder often performs post decompression filtering without respect to the macroblock coordinates. In order to achieve high display quality, Bitstream Engine 3125 uses an enhanced decoder (not shown) to retrieve supplemental information generated by the compressed bitstreams, which may include a layered video coding stream, instructional cues on how to best interpret the video streams, or an image key meta data stream. Bitstream Engine 3125 uses this supplemental information, either alone or in conjunction with MPEG-2 motion vector information, to track image flow and estimate object motion over time. Bitstream Engine 3125 compares groups of pixels from one image field to groups from subsequent and previous image fields to correlate image motion. Bitstream Engine 3125 then records the detected motion relative to the field position so that, together with input frame information and motion information, Bitstream Engine 3125 can later generate motion-compensated output frames.

For bitstreams that include a layered coding video stream, Bitstream Engine 3125 combines the different layers or types of video data to produce the highest resolution. Bitstream Engine 3125 can track macroblock and motion-based image flow across frames and GOPs on the layered coding streams. One technique for tracking image flow is to compare the coefficient data to find the same patterns across time. If the same pattern is found, it may represent the flow of an object across the frames. With layered coding, the conjecture of image flow can be further tested in the different layers to either confirm or reject the conjecture. Layered video coding is a technique for scalability which, for example, transmits multiple resolutions of video bitstreams where the higher resolutions utilize the bits from the lower resolution transmissions. In this technique a lower resolution decoder according to the invention can discard the higher resolution bitstreams, and because the higher resolution bitstreams, instead of regenerating the entire bitstream, use the lower resolution bitstreams, overall bandwidth for the higher resolution bitstream increases. Additionally, because the MPEG-2 specification specifies the complete profile for layered coding techniques, the invention provides additional control information accompanying the bitstream to comply with the MPEG-2 specification.

Bitstream Engine 3125 can use other layered coding techniques that include other types of compressed data, such as wavelet data, to enhance a base level transmission. For example wavelet data may be included as a layered stream of data. Wavelet data is compressed data that does not use the same DCT (Discrete Cosign Transform) compression scheme as the standard video portion of MPEG-2 video data. As part of the MPEG-2 syntax, the wavelet data could be coded as a private video data stream or could be part of the video program stream and indicated in the program header information. The wavelet information represents a higher resolution image for a complete or partial frame for some or all of the MPEG-2 frames. When an MPEG-2 frame that has corresponding wavelet information is decoded, the Bitstream Engine 3125 combines the MPEG-2 data with the wavelet data. Because of the different characteristics of DCT and wavelet based compression, the combination is used to produce a single high quality output frame.

Bitstream Engine 3125, via the enhanced decoder, uses instructional cues embedded in the bitstream for interpreting the video stream to utilize the macroblock and motion vector information for enhancing output images. The advantages of instructional cues are very significant over the ability to extract frame-to-frame and GOP-to-GOP correlation without the cues. Because IR 318 maintains complete GOPs in buffer memory 240, IR 318 can utilize these cues which provide information across fields, frames, and GOPs. For example, the enhanced decoder of the invention uses the macroblock information from two GOPs. For another example, Bitstream Engine 3125, recognizing the enhanced instructional cues, improves image quality by enabling IR 318 to use macroblock information from both a current GOP and an adjacent GOP. The invention is therefore advantageous over prior techniques using standard decoders that do not keep previous fields and frame information any longer than required to decode and display output frames. Additionally, the standard decoder cannot recognize the instructional cues or utilize the motion vector only for the best match within adjacent frames. Also, while the enhanced decoder of the invention can use the instructional cues to achieve a higher quality display output, the standard decoder can use the video bitstream in a standard-compliant manner. Instructional cues require only a minor amount of data to be added to the bitstream.

The invention also uses an image key meta data stream, which is a hybrid decoding type for a bitstream of combined video and synthetic data. This image key information technique allows the enhanced decoding system of the invention to generate enhanced outputs for environments where standard MPEG data may not be sufficient. The image key information records the positional information and environmental information for the "key" area in the video image. The meta data stream includes an additional description of the same key area of the image. This description is preferably generated synthetically. For example, the invention can encode a hockey game such that the encoding system tracks the hockey puck and an image key meta data stream is included in the bitstream. The enhanced decoder later uses the same key meta data stream to display an enhanced hockey puck that can be seen more easily by viewers. The invention also allows a user to vary the puck highlighting to suit the user's viewing preferences and match the user's viewing environment. A fixed puck highlighting without an option to vary the highlighting can be objectionable to many viewers.

Replacement of one object with another object in the video stream, which can be used for placement of products as advertisements, is another example of how the invention can utilize image key meta data. For example, the invention allows a broadcaster to appropriately broadcast an image of a can of soda displaying a label of either Coke® or Pepsi® because the invention allows broadcasting the soda can along with a key meta data stream that represents the label. The invention, where appropriate, allows the desired label to be superimposed on the soda can. Further, the invention can use viewer profile information to determine which product (Coke or Pepsi) is to be displayed.

Other image key information may include object information such as the depth of the object in a field. The invention uses this type of information to project images on a curved surface, such as in a digital panoramic system. The invention uses the depth information to adjust output pixels and thus varies the spatial position of an object to correct for the curved surface. Because adjusting the output pixels can cause complications, such as how these adjustments will affect the surrounding pixels, the invention, via the bitstream encoder, uses a fencing technique to lessen the impact of these adjustments. The invention marks the macroblocks that are part of the object in the video portion of the stream as "off limits," that is, these macroblocks are not to be used for motion vector prediction between frames. The invention thus allows substituting or modifying the objects or macroblocks without affecting the surrounding blocks. The invention can also use supplemental data streams in 3D camera systems that provide supplemental information, such as, what is behind the object being keyed, which is often useful for DOP 230 in the pipeline and is passed along in the pipeline.

Buffer memory 240 receives data from Analog Input Control 302, Digital Input Control 304, and Compressed Input Control 312, and provides the data to Image Reconstruction 318. Buffer memory 240 also stores IR 318 output data. The size of the buffer memory 240 affects IR 318's image reconstruction capabilities. In general, the deeper the buffer memory 240 storage, the more opportunity IR 318 has to reconstruct higher quality images. Buffer memory 240 can be used in numerous ways, depending on the type of input bitstream. For example, for high resolution bitstreams, buffer memory 240 can be used to decompress and buffer frames. For lower resolution bitstreams, buffer memory 240 can be used to store as many frames in a GOP as possible and may even extend between GOPs. In the preferred embodiment where the size of buffer memory 240 is limited and where anchor frames (typically I frames) are required, the invention, rather than storing these anchor frames, dynamically creates them from B or P frames for use as reference frames. The need to perform this will depend on the GOP structure of the input bitstream and the other system parameters, including for example, the resolution of the input frames, the amount of memory buffering available for the video data and any additional buffering requirements for adjusting the frame rate of the output. Buffer memory 240, where appropriate, is configured to best match the type of supplemental data provided. For example, in a layered coding technique, buffer memory 240 can take account of higher resolution output frames that require more memory. In an instructional cue scheme buffer memory 240 can store multiple GOP frames and generate intermediate reconstructed reference frames. Similarly, in an image key data scheme buffer memory 240 can generate the hybrid reconstructed frames that include video and synthetic data.

IR 318 preferably includes a Motion Estimator 3180 and receives image data from Analog Input control 302, Digital Input Control 304, Compressed Input Control 312, or from buffer memory 240. IR 318 processes data based on data types. For example, if data in YUV format requires a conversion to the RGB domain, then IR 318, through either mathematics calculations or a look-up table, converts YUV values to RGB color space. However, IR 318 preferably processes image frames while they are still in the YUV color space and, if required, RGB color space conversion is performed during one of the last image processing steps by DOP 230. Additionally, YUV data is often sub-sampled, that is, one UV pair may correspond to two or four Y values. Consequently, IR 318 uses the UV values to interpolate and create RGB pixels. If YUV data is interlaced then IR 318 converts the data from field based (sequential half frames) to frame based. IR 318 stores each field in buffer memory 240, then filters, analyzes, and combines the fields to generate an input image frame. IR 318, if required, retransmits the processed input frames in analog video format. Nevertheless, IR 318 preferably uses the processed image frames and the motion information created by DIP 210 while the frames and the information are still in their digital format. If IR 318 processes data, such as overlay information, relevant to image modulator 245 (FIG. 2), IR 318 provides such data to DOP 230 to later be combined with the image data frames. IR 318 may process multiple input data streams in parallel and provide such data to DOP 230 to later produce a picture-in-picture display of multiple images. IR 318 also does post decompression filtering based on block boundary information included in the input bitstream.

IR 318 can use both the compressed data including the complete object image and the bitstream motion vector information to apply the best possible filtering. The motion vectors in the MPEG-2 compliant bitstream specify the X and Y coordinates of the corner of the image blocks (typically 8×8 or 8×16 pixels), and thus indicate where macroblocks are located for each decoded frame. IR 318 utilizes the block size and the corner location to determine the four edges of the macroblocks. IR 318 then filters the image without enhancing the edges that correspond to the macroblock edges because these edges are prone to edge artifacts from the encoding process. IR 318 is therefore advantageous over prior art post decompression filtering techniques that apply an edge enhancement filter across the entire image, which increases artifacts from block boundaries.

IR 318 preferably uses techniques from, for example, Faroudja Labs and Snell & Willcox and Darim, that can sample and reconstruct input video, which includes composite, S-Video, and Component (Y, Cr, Cb) that may follow one of the industry standards such as Phase Alternative Line (PAL) or the National Television Standards Committee (NTSC). IR 318, to spatially filter for high quality image frames, preferably uses various techniques for noise reduction, such as recursive, median filter, and time base correction. IR 318 then filters the images in the time domain, that is, IR 318 detects image motion and uses a motion compensated filter to reconstruct the image.

When an image does not include MPEG-2 motion vector bitstream information, Motion Estimator 3180 preferably uses techniques such as optical flow, block matching, or Pel-recursion to estimate motion that tracks the image object motion in time. Motion Estimator 3180 can also use the same motion estimation techniques in conjunction with MPEG-2 motion vector bitstream information. Motion Estimator 3180 compares groups of pixels from one image field to those of subsequent and previous image fields to correlate object motion. Motion Estimator 3180 then records the detected motion relative to the field position so that DOP 230, together with input frame information and IR 318 motion information, can later generate motion-compensated image frames. Motion Estimator 3180 thus differs from prior art techniques in which video compression systems use the detected motion as one of the steps to compress the number of bits needed to represent a video sequence. Consequently, the invention, via Motion Estimator 3180, advantageously provides better quality images than prior art techniques.

IR 318 preferably separates its output images into video fields or frames, and creates a pointer to the start of each field (or frame). Either the actual field (or frame) data or a pointer to the field (or frame) data may serve as inputs to DOP 230. IR 318 outputs (and DOP 230 outputs), having been reconstructed in accordance with the invention can have a higher resolution than can be supported by image modulator 245. IR 318 outputs can be stored in buffer memory 240 or in a metafile that includes a description of the image both in a spatial RGB frame buffer format and in a semantic description of the image objects, textures, and motions.

Figure 4:
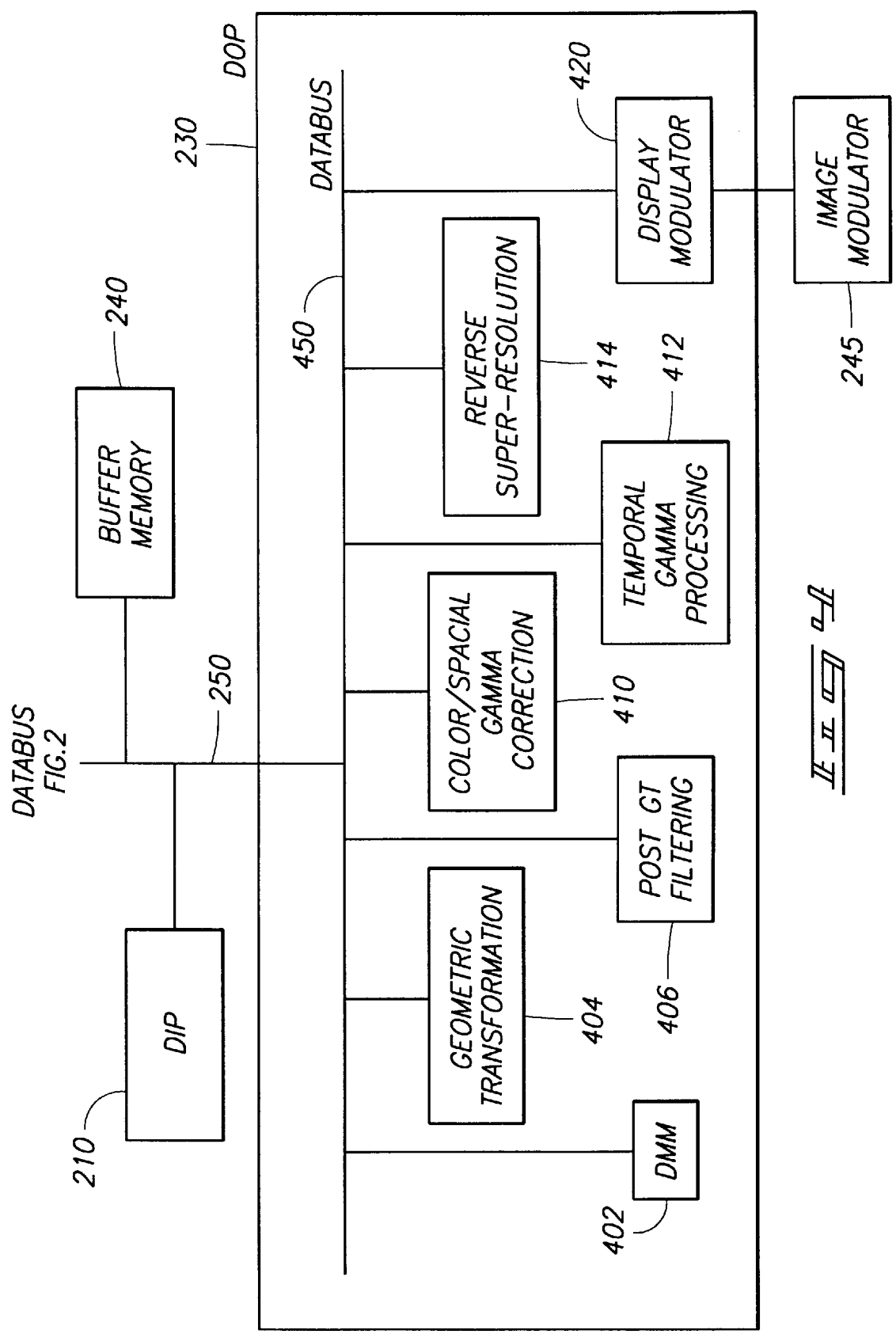
FIG. 4 is a block diagram of FIG. 2 DOP 230.

FIG. 4 is a block diagram of FIG. 2 DOP 230, which has a display map memory (DMM) 402 and image processing modules including Geometric Transformation 404, Post GT Filtering 406, Color/Spatial Gamma Correction 410, Temporal Gamma Processing (TGP) 412, Reverse Super-resolution 414, and Display Modulation (DM) 420, all connected to a databus 450. Databus 450 satisfies system bandwidth and concurrency requirements for parallel image processing. DOP 230 also connects to buffer memory 240, which stores data frames for use by each of the processing modules 402, 404, 406, 410, 412, 414, and 420, although each of these modules may include a local memory buffer (not shown).

DOP 230 receives DIP 210 outputs either directly or via buffer memory 240. DOP 230 can use pointers (if applicable) to directly access DIP 210 output data. DOP 230 also receives multiple DIP 210 output images for performing picture-in-picture operations where a single image frame includes more than one processed input video frame. DOP 230 combines overlay data both from the input coded data and from any on-screen display (OSD) information such as a user menu selection provided by the system microcontroller. DOP 230 processes its input images and outputs image data including display coordination for both video and data output, and data and control signals for each R, G, and B image color component. Frame buffer 2400 (FIG. 2) can store DOP 230 outputs.

DMM 402 stores data corresponding to image modulator 245 (FIG. 2) characteristics at chosen pixel or screen locations. DMM 402, where applicable, also stores a memory description corresponding to each display pixel or a shared description of groups of display pixels or pixel sectors. Because the description does not change on a frame-by-frame basis, DMM 402 preferably reads the description only once during the display process. DOP 230 then uses the description information to generate image frames. DMM 402, when reading data, uses a set of control registers (not shown) that provide references to the data blocks.

DMM 402 data varies and includes, for illustrative purposes, manufacturing related information, system configuration information, and user data. Manufacturing related information includes, usually at assembly time, for example, a map of locations of defective or weak pixel display bits, correlation data of ideal radial imperfections and of optically distorted projection, and correlation data for alignment points for image modulator 245. System configuration information, through an automatic self-calibration, includes, for example, a registration map having adjustable intensity values for each R, G, and B color component and the color component pixel offset at given locations. DMM 402, where applicable, preferably uses sensor techniques, such as sonar range finding, infra red range finding, or laser range finding to measure distances from a projector (not shown) to different parts of display screen 260. DMM 402 then uses these measurements to mathematically characterize and model a projection display system. DMM 402 thus allows projecting images onto a mathematical approximation of a display screen 260 surface. User data includes user preference information such as brightness, color balance, and picture sharpness that are input by a user during a setup sequence. DMM 402 preferably provides data, either directly or through buffer memory 240, to Geometric Transformation module 404.

Geometric Transformation 404 redefines the spatial relationship between pixel points of an image to provide to frame buffer 2400 compensated digital images that, when displayed, exhibit the highest possible image quality. Geometric transformation, also referred to as warping, includes image scaling, rotation, and translation. Geometric Transformation 404 resamples data to produce an output image that can readily map onto FIG. 2 image modulator 245. However, the Geometric Transformation 404 output data points, due to scaling or resampling, may not correspond one-to-one data points the image modulator 245 grid. Consequently, DOP 230 includes Post Geometric Transform Filtering 406 to filter the transformed data samples from Geometric Transformation 404 and produce an output pixel value for each data point of image modulator 245. Post Geometric Transform Filtering 406 uses spatial filtering methods to smooth the image and to resample, and thus properly space, the data samples.

Geometric Transformation 404 also improves display image characteristics related to image modulator 245 and the display system. For image modulator 245 screen regions that have more image modulator 245 pixels than screen 260 pixels. Geometric Transformation 404 adjusts the pixel values by a spatial filtering to reduce differences in neighboring pixel values. Consequently, the corresponding image (stored in frame buffer 2400) is smooth and does not contain artifacts. For screen display regions that have fewer image modulator 245 pixels than screen 260 pixels, Geometric Transformation 404 uses edge enhancement filtering to increase differences between neighboring pixel values to pre-compensate for distortion that will be introduced when image projection spreads out neighboring pixels.

Geometric Transformation 404 preferably uses filtering algorithms, such as nearest neighbor, bilinear, cubic convolution, sync filters, or cubic spline interpolation, to process images and thus produce accurate interpolated image pixel values. Further, where multiframe restoration requires, Geometric Transformation 404 uses time varying filtering methods such as projection onto convex sets (POCS) and Wiener deconvolution. Based on the computation complexity, Geometric Transformation 404 chooses an appropriate filtering technique.

Geometric Transformation 404 can improve image deficiencies related to the screen 260 environment. Geometric Transformation 404 performs a spatial projection which warps the image to compensate for a curved display screen 260 as is usually used in front projection theater systems, and subsequently uses bitstream information to improve the image. For example, if it can acquire the depth of moving objects, Geometric Transformation 404 can reduce the distorted motions at the edges of a curved screen 260. Geometric Transformation 404 constructs an optical flow field of the moving objects along with the object distance information. Geometric Transformation 404 then uses motion adaptive filtering to construct a sequence of output frames that position the objects at the proper spatial coordinates in the time domain. Geometric Transformation 404 thus, during projection on a curved screen 260, conveys the proper motion of all objects in a scene. Geometric Transformation 404 also works in conjunction with an optical correction to improve distortions resulting from the different focal distances from a projector (not shown) to different parts of screen 260. Geometric Transformation 404 uses range finding techniques (discussed above) to construct a model of the screen 260 environment and then uses the information from the model and the optical system to mathematically construct a formula to compensate for image distortions. Geometric Transformation 404, to correct a warping distortion produced by an optical system, uses the same mathematical basis for a flat screen geometric transformation to apply to a curved screen.

Geometric Transformation 404 uses special processing, similar to the curved screen 260 processing, for various head-mounted displays (HMDs). A HMD is a display unit combined with a helmet or glasses that a user wears and usually includes two image modulators 245, one for the right eye and one for the left eye. HMDs are useful for a single viewer and, because of their physically smaller area, display high quality images.

Geometric Transformation 404, without considering motion adaptive filtering, treats image spatial projection with warping onto a curved screen 260 in the context of 3D graphs. Geometric Transformation 404 considers a display image frame as a 2D texture and considers a curved surface as a 3D surface. Geometric Transformation 404 then maps the 2D texture onto a surface that is the mathematical inverse of the curved screen 260. Geometric Transformation 404 thus pre-corrects the image frame so that, when projected, the mapped image will have filtered out the distortions associated with a curved screen 260. Geometric Transformation 404 preferably uses techniques such as anisotropic filtering to assure that the best texture is used in generating output pixels. Geometric Transformation 404 also preferably uses filtering techniques such as sync filters, Wiener deconvolution, and POCS, and/or other multipass filtering techniques to filter the images off-line and then output the filtered images onto a film recorder. Geometric Transformation 404 preferably allows more computationally intensive image operations to be performed off-line.

Geometric Transformation 404 processes video as 3D texture mapping, preferably using systems that accommodate multiple textures in images. For example, Geometric Transformation 404 can use high quality texturing techniques such as bump mapping and displacement mapping which apply multiple texture maps to an image. For another example, Geometric Transformation 404, modeling the graininess inherent in film, applies multi-surface texturing to give video a more film-like appearance. Geometric Transformation 404 can allow a user to select the graininess modeling feature as part of the setup procedure similarly to selecting room effects such as "Hall," "Stadium," etc., in an audio playback option.

Geometric Transformation 404 can process digital data from a multi-camera system to improve the focus, and thereby provide higher quality images for image modulator 245. Geometric Transformation 404 evaluates which of the multiple camera views provides the best focus for an object and then reconstructs the object in proper perspective. Geometric Transformation 404 then combines the multiple camera views on a regional or object basis to produce output images.

Geometric Transformation 404 can also use multi-camera bitstream information included in the image data to determine the object depth of a scene and to construct a 3D model of the shape and motion pattern of the moving objects. Geometric Transformation 404 then uses the same bitstream information to solve problems related to a curved screen 260 projection to achieve proper object motion completely across the screen 260.

Geometric Transformation 404 can also improve auto stereoscopic 3D display systems in which multiple camera channels present a binocular display and each of a viewer's eye sees a different monocular view of a scene. Geometric Transformation 404 can construct each of the monocular views in accordance with the focus and motion adaptive filtering techniques described above.

Color and Spatial Gamma Correction 410 converts YUV to RGB color space and determines the intensity values for each of the R, G, and B color components. Those skilled in the art will recognize that a color space conversion is not necessary if it has been done previously or if the image is otherwise already in the RGB color space. Color and Spatial Gamma Correction 410 preferably uses a look-up table, in which each of the R, G, and B color components has values corresponding to color intensities, to translate image colors. Each R, G, and B intensity value represents an index into the look-up table, and the table provides the output (or "translated") value. Color and Spatial Gamma Correction 410 independently processes each R, G, or B color component. Color and Spatial Gamma Correction 410 maps each color component based both on a combination of individual RGB values and on RGB values of surrounding pixels. For example, if FIG. 2 image modulator 245 requires a certain brightness for an identified area on display screen 260, then Color and Spatial Gamma Correction 410 may use the RGB values of the pixels in the identified area and of the pixels in the neighboring area. Color and Spatial Gamma Correction 410 uses mathematical calculations, or preferably a color look-up table (CLUT), to provide the RGB values for the desired image outputs. Color and Spatial Gamma Correction 410 prefers using a CLUT to mathematical calculations because a CLUT allows a non-linear mapping of the input RGB values to the translated (output) RGB values. A non-linear mapping enables input colors represented by RGB values to be adjusted (emphasized or de-emphasized) during the mapping process, which is useful for crosstalk suppression and for compensation of shortcomings in a color gamut of image modulator 245. Color and Spatial Gamma Correction 410, to realize a non-linear relationship, uses a translation table represented by a number of bits that is larger than the number of data input bits. For example, if eight bit represents 256 (=$2^8$) color component intensity values, then Color and Spatial Gamma Correction 410 uses, for another example, 10 bits to represent 1024 (=$2^{10}$) translated values. A system manufacturer maps 256 values to 1024 translated values.

TGP 412 assures that time related representation of an image is as accurate as possible. TGP 412 independently processes each R, G, or B color component and compensates for modulating transition characteristics that, due to the nature of LCD image modulator 245, are not purely digital. TGP 412 is described in detail with reference to FIGS. 6 and 7.

Reverse Super-resolution 414 performs a superset of the frame rate conversion process for converting between disparate input and output frame rates, and can improve display quality when intended display images have higher apparent resolution than can be supported by image modulator 245. Reverse Super-resolution 414, block by block, spatially filters one frame in a video sequence having a transfer rate of X fps rate to Y number of reverse super-resolution (RSR) frames having a transfer rate of Z fps, where Z=XxY. Reverse Super-resolution 414 then shifts by the same pixel (or pixel fraction) amount the pixel matrix representing each RSR image block. For example, because there are Y RSR frames, Reverse Super-resolution 414 shifts the pixel matrix block Y times, once for each RSR frame, and each shift is by the same pixel (or pixel fraction) amount. Consequently, Reverse Super-resolution 414 produces each RSR frame with a motion compensated weighted center filter so that the center of the input image is constant for each RSR frame. Reverse Super-resolution 414 preferably uses image blocks having 8×8 to 256×256 pixels where each block has uniquely processed motion information. With increased processing, each pixel or sub pixel will have its motion information processed uniquely. Reverse Super-resolution 414 is further illustrated with references to FIGS. 8 and 9.

Display Modulator (DM) 420 preferably receives DOP 230 (processed) output data, and controls sending of that data to image modulator 245. DM 420, to prevent tearing within an image frame, may include control for timing updates with respect to the display timing. DM 420 outputs include separate data and control signals for each R, G, and B color component. For TFT displays that include column drivers, DM 420 outputs, for example, can be on one or two 24-bit digital busses that drive a raster scan. Alternatively, DM 420 may use voltage or frequency modulation techniques for outputs to drive image modulator 245. DM 420 outputs, for a flat panel display, include row and column drivers, and for each active matrix TFT, passive matrix LCD display, or other display type that requires them, includes voltage level specifications. Prior to modulating images, DM 420 determines the simplest way, the frequency, and the values represent the data to be written to image modulator 245. DM 420 uses TPG 412 and Reverse Super-resolution 414, which include both compensation for the time response associated with image modulator 245 and an algorithm that increases the display update rate (or refresh rate), to increase the perceived resolution of image modulator 245. DM 420 stores in buffer memory 240 a copy of the previous data frame that was output to image modulator 245, and uses this previous frame data as a delta or "difference" buffer to reduce the amount of image updating performed by DM 420. DM 420 compares the new data and the previous frame data for a pixel, or a group of pixels, and if the new data is the same as the previous data, DM 420 does not update that pixel, or group of pixels.

Figure 5:
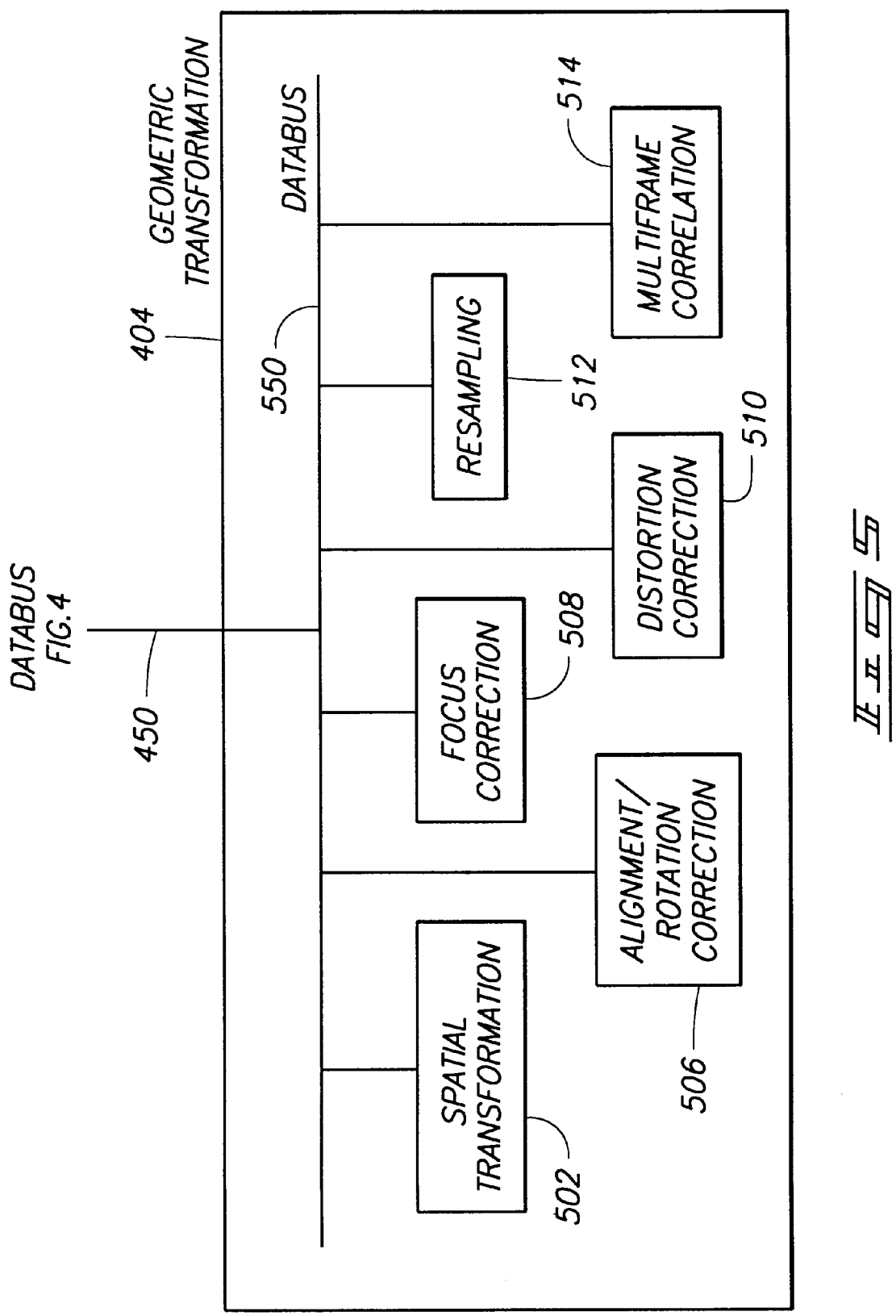
FIG. 5 is a block diagram of FIG. 4 Transformation 404.

FIG. 5 is block diagram of Geometric Transformation 404 of FIG. 4 and includes image processing modules Spatial Transformation 502, Alignment and Rotation Correction 506, Focus Correction 508, Distortion Correction 510, Resampling 512, and Multiframe Correlation 514, all interconnect via a databus 550. These processing modules, although they are shown as separate blocks, can be a single programmable processor performing the functions of the various module.

Spatial Transformation 502 redefines the spatial relationship between image pixel points. Spatial Transformation 502, for example, in an X-Y alignment in a projection system with three image modulators 245, allows each image modulator 245 to have extra pixel rows and columns. Spatial Transformation 502 then digitally adjusts the image pixels in the X-Y plane and writes the adjusted pixel data to image modulators 245. For example, if the pixel adjustment is by an integer, Spatial Transformation 502 shifts the old imaging pixel address by the integer number of pixels to adjust. However, if the adjustment is a non-integer then Spatial Transformation 502 resamples the image with a weighted filtering algorithm to acquire new pixel values. Spatial Transformation 502 also deals with image modulator 245 one-dimensional skew, tangential symmetry, aspect angle, and scale related distortions. Spatial Transformation 502 uses resampling and weighted filtering algorithms to correct for such distortions on a pixel line by pixel line basis. Spatial Transformation 502 can perform texture mapping as in a traditional 3D rendering process.

Alignment/Rotation Correction 506 deals with image modulator 245 two dimensional skew, tangential symmetry, aspect angle, and scale related distortions. Alignment/Rotation Correction 506, for each R, G, and B color component, uses resampling and weighted filtering to reposition pixels in the both horizontal and vertical directions so that, when output, each color component is positioned in the proper locations across the entire image. Alignment/Rotation Correction 506 also repositions pixels to rotate display images. Alignment/Rotation Correction 506, to correct rotational misalignment for three image modulators 245 or geometric distortion from lenses, performs a geometric transformation to pre-compensate the images.

Focus Correction 508 improves non-uniform defocus, including defocus introduced by image modulator 245 optics. Focus Correction 508, to account for focus problems of display screen 260, preferably filters the image to pre-compensate the digital data representing the image. If a display screen 260 area has more image modulator 245 pixels than display screen 260 pixels, Focus Correction 508, on a single frame basis, uses noise filtering techniques to apply linear filters, nonlinear filters, and adaptive filters. Focus Correction 508 additionally uses techniques based on POCS to pre-compensate for anticipated focus blurring. In contrast, if the display screen 260 area has fewer image modulator 245 pixels than screen 260 pixels, Focus Correction 508 uses convolution techniques or reverse filtering techniques to perform edge enhancements to pre-compensate for the pixels being spread out and the image being blurred during projection. The spatial spread of the image due to the display system is characterized as the display system Point Spread Function (PSF).

Distortion Correction 510 corrects image distortion, including keystone effects. Distortion Correction 510 provides each image with a scan line having a different scale factor to precompensate for projection distance differences. Distortion Correction 510, starting from the upper portion of the image, filters the image, that is, permits the image to use fewer pixels on image modulator 245 so that, when projected, images on screen 260 will be proportioned properly.

Distortion Correction 510 also corrects for radial distortion introduced by lens systems. In regions where radial distortion increases the pixel density of display screen 260, Distortion Correction 510 uses a spatial filter to reduce any differences between neighboring pixel values. Consequently, the corresponding image is smooth and does not contain artifacts including high frequency artifacts. For screen display 260 regions that have fewer pixels than display screen 260 pixels, Distortion Correction 510 uses a filtering technique to perform edge enhancements which increase differences between neighboring pixel values. This pre-compensates for the PSF distortion which will be introduced during display where neighboring pixels are spread out. Consequently, the display process smoothes out images that would have had sharp edges to have a more uniform appearance. Distortion Correction 510 preferably acquires specific distortion patterns form DMM 402.

Resampling 512 translates the pixel values from high resolution grids to new pixel values on image modulator 245 grids.

Multiframe Correlation 514 improves multiple frame display quality. For both increased and decreased pixel representations, Multiframe Correlation 514 uses algorithms such as Wiener deconvolution to exploit the temporal correlation between frames. Multiframe Correlation 514 uses multiframe techniques that process more than one input image frame to construct an optical flow field, which is further processed to construct output frames. IR 318 can provide frame inputs to Multiframe Correlation 514. Alternatively, these frame inputs may be part of the compressed data input to Compressed Input Control 312. Multiframe Correlation 514 can use filtering and POCS techniques to extract multiple frame information from the compressed bitstream.

Multiframe Correlation 514 also converts an input frame rate to an output frame rate, for example, from 24 frames per second (fps) to 60 fps. Multiframe Correlation 514, thus, from the sequence of 24 input frames, generates 60 unique and distinct output frames wherein all moving objects are motion-compensated so that at the time when they are displayed, they are at the proper spatial coordinates. Information for generating proper output frames results from the input frame, motion estimation information, and object motion prediction. Motion estimation information is either part of the MPEG-2 input bitstream or generated by Motion Estimator 3180 during image input processing.

Figure 6:
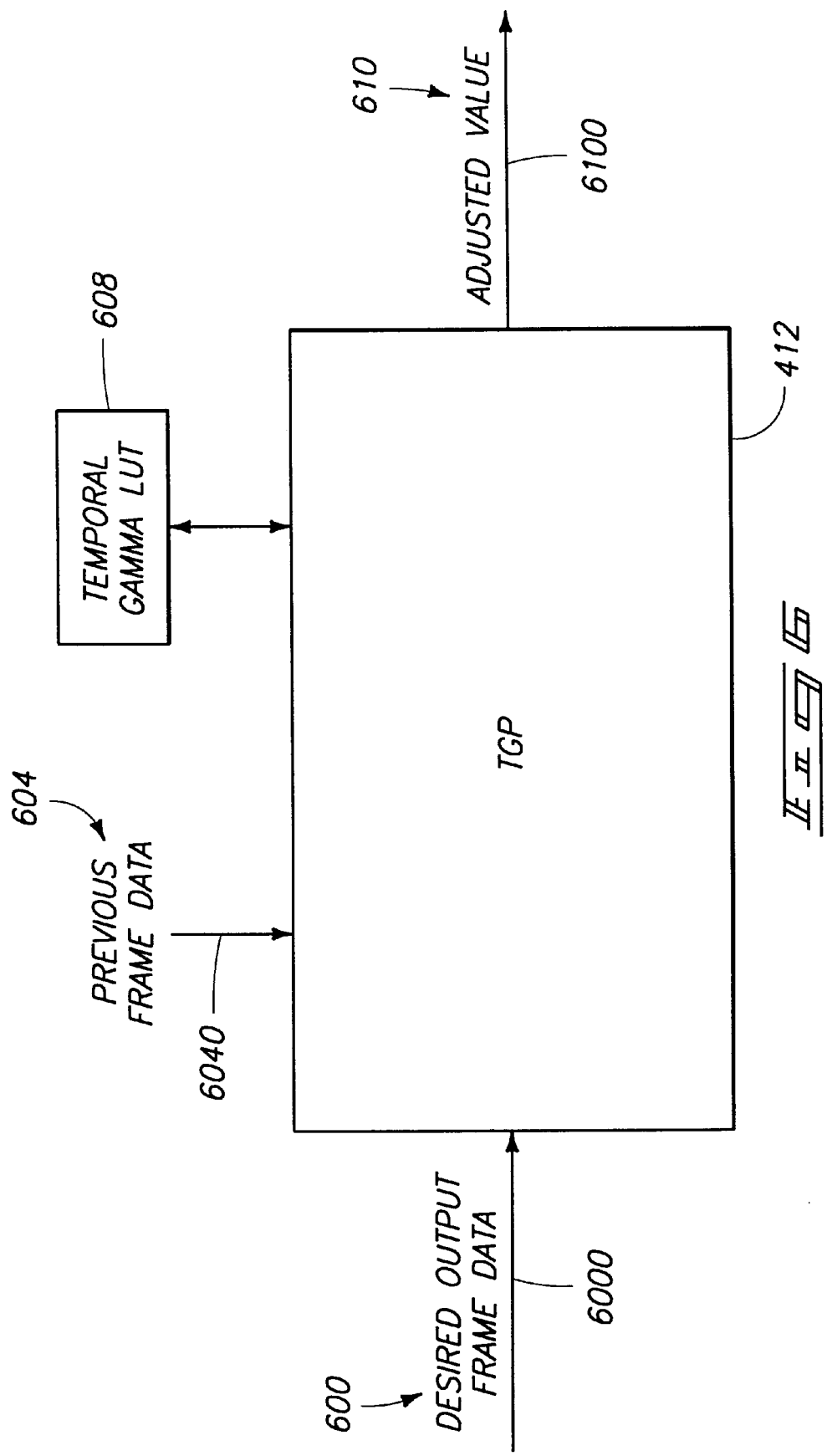
FIG. 6 illustrates the operation of FIG. 4 TGP 412.

FIG. 6 illustrates the operation of FIG. 4 TGP 412, which receives desired output frame data 600 on line 6000 and previous frame data 604 on line 6004, and outputs value 610 on line 6010. Desired output frame data 600, previous frame data 604, and adjusted output value 610 are in R, G, and B color component values. Desired output frame 600 preferably has been sampled by Resampling 512 (FIG. 5). Previous frame data 604 corresponds to the last frame data of desired output frame 600 that was output to image modulator 245. Previous frame data 604 is preferably stored in memory buffer 240 because previous frame data 604 cannot be efficiently read from image modulator 245, which does not provide a reliable or fast read path. TGP 412, processing each R, G, and B color component independently for each pixel, uses previous frame data 604 to select a look-up table in temporal look-up table (TG LUT) 608, and from that selected table uses desired frame data 600 to provide adjusted value 610.

Figure 7:
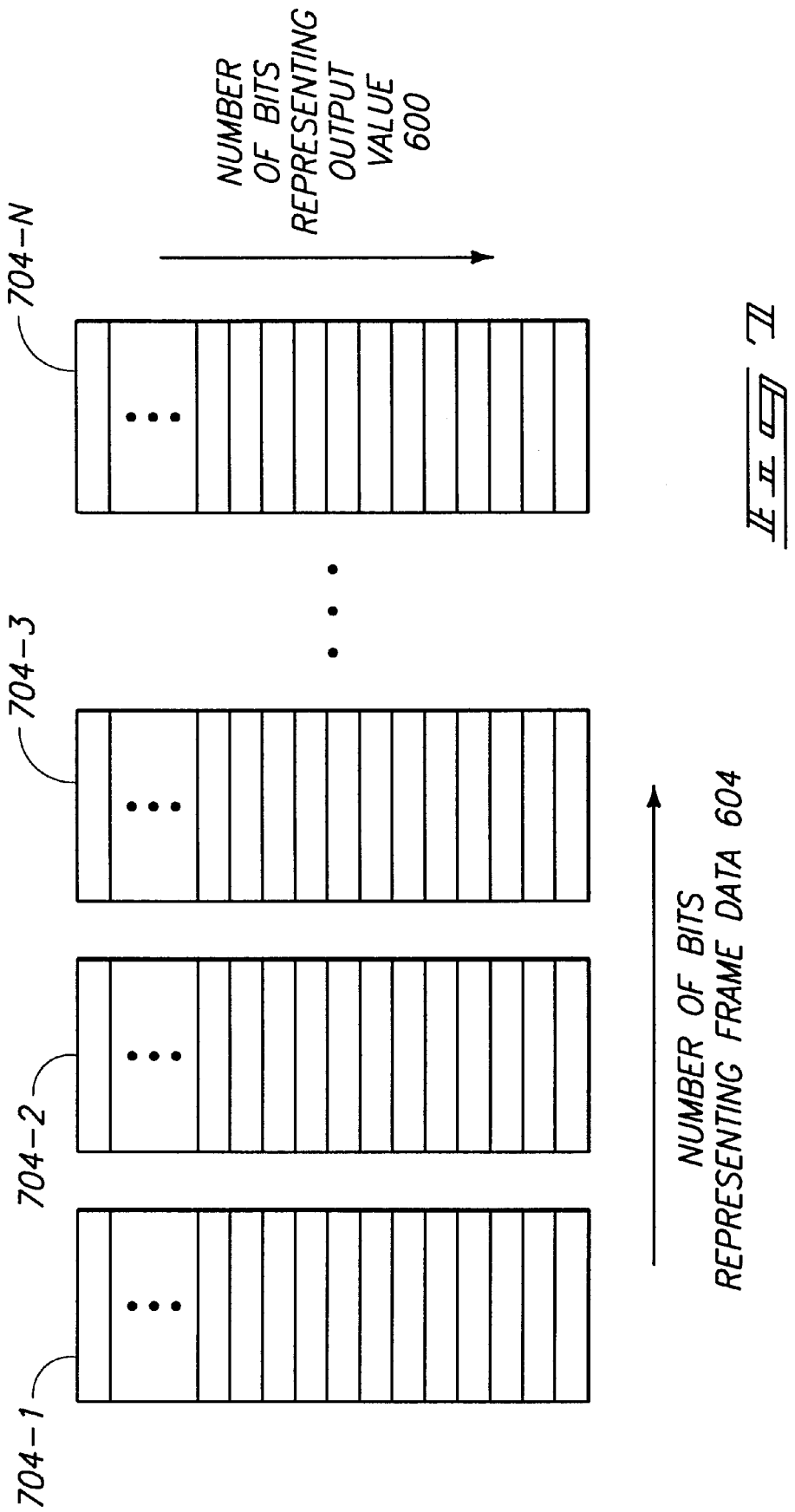
FIG. 7 illustrates the operation of FIG. 6 TG LUT 608.

FIG. 7 illustrates the operation of FIG. 6 TG LUT 608, which includes translation tables 704-1 to 704-N. The number of bits representing desired output value 600 determines the depth of table 704, that is, the number of (Red, Green, or Blue) color component intensities a table 704 can store. The number of bits representing previous frame data 604 provides the number of tables 704. Consequently, if for example, 8 bits represent desired output data 600, then each table 704 can store 256 (=$2^8$) intensity values for each R, G, and B color component. Similarly, if another 8 bits represent previous frame data 604, then TGP 412 includes 256 tables 704 (from 704-1 to 704-256). However, TGP 412, when applicable, as when extensive mapping is not required, uses only the upper significant bits of previous frame data 604 to reduce the number of tables 704. For example, if previous frame data 604 uses only five most significant bits, then TGP 412 includes only 32 (=$2^5$) tables 704. TGP 412, when selecting a table 704, performs both the traditional spatial gamma correction and the temporal gamma correction.

The intensity value for each color component in each table 704 may contain more bits than the number of input data bits. For example 8 bits may represent 256 (=$2^8$) desired output values 600 while 10 bits represent 1024 (=$2^{10}$) look-up table entries in table 704. Consequently, a system manufacturer can map from 256 values to 1024 values.

Figure 9:
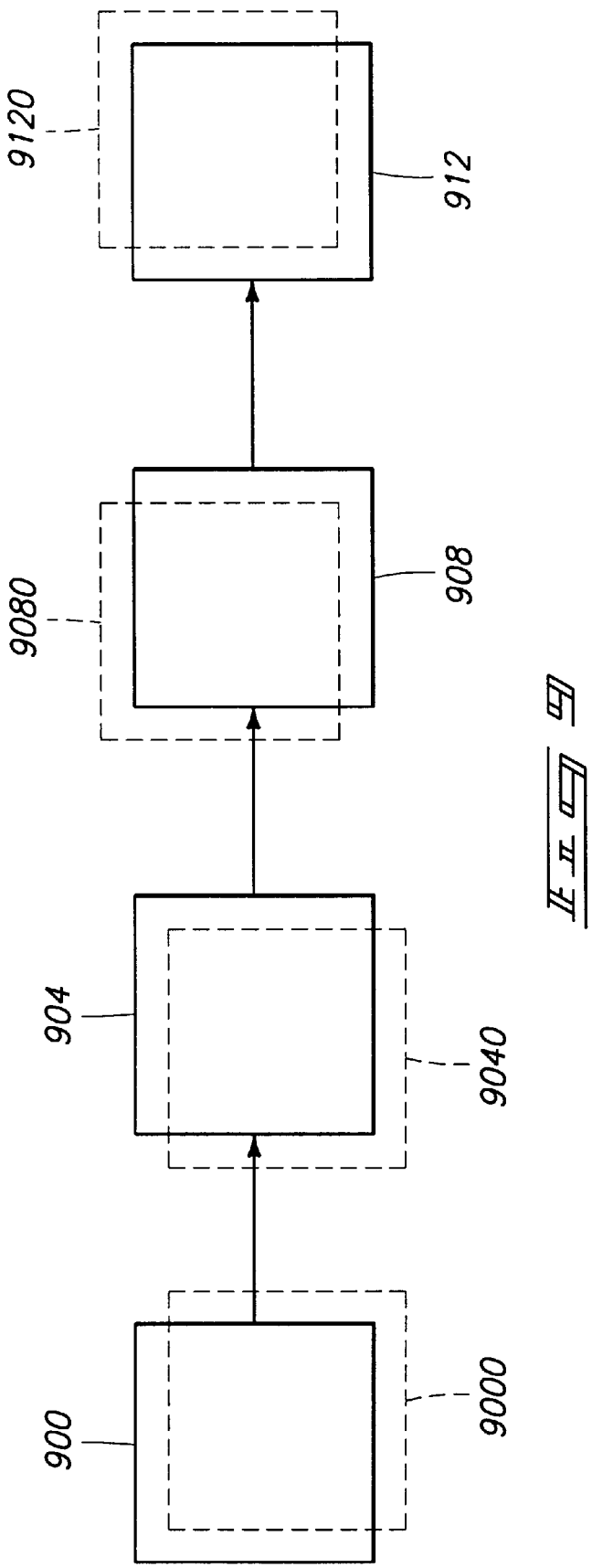
FIG. 9 illustrates reverse super-resolution operating on an image.

FIG. 8 and FIG. 9 illustrate the operation of Reverse Super-resolution 414 performing on a video sequence containing images that have spatial resolution four times higher than can be supported by image modulator 245. FIG. 8 shows, for example, a video image 800 having an 8×8 pixel resolution and image modulator 245 having a 4×4 pixel resolution. For illustrative purposes the video sequence transfer rate is 24 fps. Reverse Super-resolution 414 filters each 24 fps frame into four 96 (4×24) fps images.

FIG. 9 shows an image from 900 transitioned into frames 904, 908, and 912. However, to achieve a higher apparent resolution output image, Reverse Super-resolution 414, block by block, spatially filters frame 900 to frame 9000, that is, Reverse Super-resolution 414 resamples each frame 900 block such that each frame 900 block output pixel matrix is, for example, shifted half a pixel to the bottom and half a pixel to the right. Reverse Super-resolution 414 thus causes the effective center, or the weighted and spatially filtered center, of each pixel in a frame 900 block to shift in the center of the upper left quadrant of each pixel. Spatially filtering each block by block (versus an entire frame at once) allows the filter coefficients to more accurately represent the desired block outputs. Combining each block output produces the new output frame. Further, spatially filtering each frame 900 to frame 9000 causes the viewable area of frame 9000 to be one pixel less on each edge than that of frame 900. As frame 900 is transitioned to frame 904, Reverse Super-resolution 414 filters frame 904 to frame 9040 (again on a block by block basis). Consequently, the frame 904 output pixel matrix is shifted half a pixel to the left and half a pixel to the bottom (the weighted center of each pixel shifts to the upper right quadrant). Similarly, as frame 904 is transitioned to frame 908, Reverse Super-resolution 414 filters frame 908 to frame 9080, and as frame 908 is transitioned to frame 912, Reverse Super-resolution 414 filters frame 912 to frame 9120. As a result, the frame 908 output pixel matrix is shifted half a pixel to the left and half a pixel to the top (the weighted center of each pixel shifts to the lower right quadrant), and frame 912 output pixel matrix is shifted half a pixel to the right and half a pixel to the top (the weighted center of each pixel shifts to the lower left quadrant). Those skilled in the art will recognize that any "pixel fraction" can substitute for "half a pixel" in the above discussion. In accordance with the invention, Reverse Super-resolution 414 produces, for static images, a stable output to a viewer because human vision interpolates multiple images to form one continuous image view.

However, for moving images, Reverse Super-resolution 414 outputs contain unwanted motion artifacts. Consequently, to prevent these artifacts, Reverse Super-resolution 414 uses motion-adaptive filters, including median filters, that include motion tracking to filter each block constituting each image frame (900, 904, etc.). Reverse Super-resolution 414 also uses the block-based motion estimation in MPEG-2 to track the image. Reverse Super-resolution 414 first identifies the motion blocks of the objects within an image, and then allows successive output frames to utilize the image object motion information and to move the center weighting for the corresponding pixels to correlate to the object motion. Reverse Super-resolution 414 also uses multiple input frames or fields to track the trajectory and velocity of moving objects and thereby predicts object spatial position in a frame. As a result, Reverse Super-resolution 414 greatly reduces or even eliminates motion artifacts.

Reverse Super-resolution 414, when compressed bitstream data is received, can extract the motion tracking information directly from the bitstream, which preferably includes the data to discern which blocks contain moving objects and the object movement patterns. One technique for detecting block based motion is to detect blocks in adjacent frames that have similar coefficient data being shifted. Alternatively, Reverse Super-resolution 414 can extract the same motion tracking information from post-decoded (or decompressed) frames. Reverse Super-resolution 414 then provides the motion tracking information to the filtering algorithms.

Reverse Super-resolution 414 can improve FEDs and their display class. For example, Reverse Super-resolution 414 combines the FED mesh cell configuration and its address control to perform reverse super-resolution and, from high resolution images, produce lower resolution images. Reverse Super-resolution 414 uses the same technique for generating the spatially filtered reverse super-resolution frames to determine the sequence of lower resolution images. Super-resolution 414 then, taking advantage of the sub pixel addressing within a pixel that is unique to the microtips and mesh structure of the FED, writes the sequence of the frames within the FED sub pixel addressing.

FIG. 10 is a flowchart illustrating DIP 210's image processing steps in selecting and reconstructing images. In these steps, DIP 210, where applicable, preferably creates a database to store motion information for later use by DOP 230. In step 1004, system 200, via connector 300 of DIP 210, receives input images. In step 1008, a microcontroller preferably selects one or more input images and provides each image to appropriate image processing modules Analog Input Control 302, Digital Input Control 304, and Compressed Input Control 312. Each processing module 302, 304, and 312 in step 1012 samples, and thereby recovers, the input images. Analog Input Control 302 may discard unnecessary or repeated input fields.

Compressed Input Control 312, via Bitstream Engine 3125, analyzes the compressed input streams and selects one or more picture streams for analysis and processing. For quality picture display, Bitstream Engine 3125 records the motion information from the bitstream for use in the image reconstruction steps 1020, 1024, and 1028, and by the DOP 230. Bitstream Engine 3125, based on a quality trade-off decision, can select a single picture or decode multiple pictures. This is because system 200 may not have the compute power required to process multiple input streams at full quality. If multiple pictures are to be displayed simultaneously, each picture will be only a portion of the total display output and thus can cause lower visual display quality than if a single picture were used for the full output. Bitstream Engine 3125, while sampling a compressed stream, may extract multiple picture streams, and, if required, uses a transcoding technique to reduce the complexity of the multiple picture streams to be processed. To reduce the amount of DCT decoding and thereby the decoding complexity of a bitstream, transcoding discards some of the information from the video portion of the bitstream while the data is still in the DCT frequency domain. Alternatively, the transcoding technique, together with hardware for the full bitstream decoding, decodes the full bitstream and scales the image to a lower resolution, which results in a higher quality image.

In step 1016 each processing module 302, 304, and 312 preferably formats the images and stores them in buffer 240. In this step 1016 Decompression Engine 3120 preferably uses the MPEG-2 decompression steps to convert the compressed bitstream into a decompressed and decoded picture. Decompression Engine 3120 can simultaneously decompress more than one compressed picture stream for multiple picture displays including advanced picture-in-picture displays and multi-camera systems. For input data that includes layered coding information, where there is a base layer and an enhancement layer of coded information, Decompression Engine 3120 can decode both layers for use by the Image Reconstruction 318.

Image Reconstruction 318 in step 1020 spatially filters each image frame to reconstruct 2D images. Spatial filtering includes various techniques for noise reduction so that the filtered image does not include artifacts that were not part of the original image. Filtering is preferably applied across the entire input image based on the data values. However, filtering can use additional information, such as spatial position of the decoded macroblocks, that is provided by Bitstream Engine 3125 in cases where, for example, the MPEG-2 data has been decompressed by Decompression Engine 3120. This positional information allows the filter to reduce or eliminate artifacts from boundary edges from the decoded macroblocks while performing the more traditional spatial filtering on the other portions of the image. Unlike prior art systems, the continuous information from both the bitstream and the decoded frames is preserved across at least one GOP so that steps 1020, 1024 and 1028 can utilize not only the current frame information, but also information from the surrounding frames for reconstructing images.

In step 1024 Image Reconstruction 318 performs scene analysis on each of the spatially filtered input images. For input images that were not MPEG-2 data, Image Reconstruction 318 analyzes and arranges the scene data as groups of pixels for use by Motion Estimator 3180. For MPEG-2 data, Image Reconstruction 318 can combine the motion vector information, which is usually block based, with the decoded and filtered images to recognize image objects. Image Reconstruction 318, from the bitstream vector information and the detected object edges provided by Bitstream Engine 3125, can determine where to look for the object in the next frame, and thus analyze optical flow and reconstruct the highest quality frames. Image Reconstruction 318 can apply a filter, such as a sharpening convolution filter, to enhance and sharpen the image edges. Image Reconstruction 318, via the enhancement filter that uses information from the Bitstream Engine 3125, can enhance input image details without amplifying the compression artifacts.

Image Reconstruction 318 in step 1028 performs temporal analysis, which utilizes multiple scenes to filter the images and to record the object motion information. For input data that was interlaced, Image Reconstruction 318 de-interlaces the input fields. Image Reconstruction 318, using temporal analysis, performs median filtering and reconstructs the spatial resolution of each image based on the information from the neighboring images. Image Reconstruction 318 uses Motion Estimator 3180 to estimate the motion information for objects that were detected during the scene analysis in step 1024.

Image Reconstruction 318 in steps 1020, 1024, and 1028 can utilize supplemental information from an input stream such as a layered coding, instructional cues or key image meta data in order to generate the highest quality reconstructed frames. The supplemental information that is useful for DOP 230 is preserved and made available along with the reconstructed frames.

FIG. 11 is a flowchart illustrating DOP 230's image processing steps. DOP 230 in step 1104 receives DIP 210 outputs which include both the spatially enhanced image and supplemental information that includes, for example, motion information, other object or block based information, sensor or multi-camera view information, and other information about the images. In step 1108, DOP 230 combines DIP 210 outputs with the display system information to perform image geometric transformation including spatial transformation, alignment/rotation, focus, and distortion correction. Geometric transformation can improve display deficiencies related to the display environment, such as introduced by image modulator 245, screen display 260, and display system optics 120. Geometric transformation can also produce enhanced output images that correct for special environments such as head-mounted, panoramic, and stereoscopic display systems. The spatial filtering techniques of Geometric Transformation 404 can use traditional real-time 3D graphics techniques such as texture mapping to achieve the desired image manipulations.

DOP 230 in step 1108, via Multiframe Correlation 514, increases the spatial resolution of the transformed output frames. Multiframe Correlation 415 uses motion vector information, either alone or in combination with, the original bitstream input, a Bitstream Engine 3125 enhanced version of the original bitstream, or the Motion Estimator 3180. Combining the spatial and temporal processing that utilizes the information of multi frames (versus just one frame) allows increasing the image output resolution, which, along with other steps, allows the image output resolution to be higher than the input resolution.

DOP 230 in step 1112 performs frame rate conversion (FRC), which also uses the motion vector information in motion compensated filtering. FRC is usually required where the input frame rate is different than the output frame rate. For highest visual display quality, FRC uses both the transformed image data and the supplemental information, such as motion vector information, to produce a unique set of motion compensated output frames. These unique output frames temporally adjust the output images to produce smooth and accurate motion portrayal. For example, DOP 230 can use motion vector information to produce an output image where an object that changes location from one input frame to the next is shown to be fractionally between the two locations for the output frame. DOP 230 also uses motion compensated filtering for the special display environments such as a panoramic system where the motion portrayal needs to correct for the non-uniform nature of having a curved display screen 260.

In step 1116, DOP 230, via Reverse Super-resolution (RSR) 414, performs image reverse super-resolution, which is a special case of FRC where the output frame sequencing is not only for motion portrayal, but also for increasing the apparent spatial resolution of the display. Reverse super-resolution is particularly applicable to display systems where image modulator 245 supports a high refresh rate. Reverse Super-resolution 414 may perform system frame rate conversion. Alternatively, Multiframe Correlation 514 of Geometric Transformation 404 may generate the RSR frames. Reverse super-resolution produces the highest image quality when the motion compensated filtering is carefully matched to small block sizes or to individual pixels. Like Multiframe Correlation 514 and FRC, Reverse Super-resolution 414 utilizes motion vectors for generating output frames.

In step 1120 DOP 230 uses Color/Spatial Gamma Correction 410 and Temporal Gamma Processing 412 to perform gamma correction both spatially and temporally. Gamma correction translates each display pixel and assures that the display system achieves the full color gamut. Gamma correction preferably uses gamma correction tables loaded during system configuration.

In step 1124 DOP 230 uses Display Modulator 420 to control the sending of display images to image modulator 245. For special displays that contain multiple simultaneous images, such as a panoramic or stereoscopic display system, Display Modulator 420 may sequence or control the output of more than one output image.

DOP 230 in steps 1112, 1116, 1120, and 1124 takes account of manufacturing defects, calibration data, environment effects, and user controlled step information. Each processing step 1112, 1116, 1120, and 1124 can also support multiple simultaneous images that are used for a multiple window display or advanced picture-in-picture display. Additional display output information such as on-screen display and overlay information is also merged into the display stream such that it becomes part of the output image.

DOP 230 in step 1128 sends display images and control information to a digital memory or image modulator 245, which provides images to display screen 260, either directly or through a projector. By combining DOP 230 and image modulator 245 in a tightly coupled system, precise control of the output image can be achieved to produce very high quality display images.

The invention has been explained above with reference to a preferred embodiment. Other embodiments will be apparent to those skilled in the art in light of this disclosure. For example, system 200 of the invention can be implemented in either hardware or software or a combination of fixed function and programmable hardware. These and other variations upon the preferred embodiment are intended to be covered by the appended claims.

What is claimed is:

1. An image processing apparatus for processing bitstream information to provide video stream image data to a display device, comprising:

a display input processor (DIP) coupled to a databus, said DIP comprising, an input data connector and a first plurality of processing modules, said first plurality including a digital input control module, a compressed input control module and an image reconstruction module, wherein at least one of said first plurality of processing modules is coupled to said input data connector, and wherein said first plurality provides for receiving, reconstructing and processing said bitstream information to provide first outputs to said databus;

a display output processor (DOP) coupled to said databus, said DOP comprising, a second plurality of processing modules, including a geometric image transformation (GIT) module wherein said second plurality provides for receiving and processing said first outputs to provide second outputs to said databus; and a buffer memory coupled to said databus, wherein said buffer memory stores said first and second outputs and provides said video stream image data to said display device.

2. The apparatus of claim 1 wherein said DOP comprises a display memory map.

3. The apparatus of claim 1 wherein said second plurality of modules comprises a post GIT filtering module.

4. The apparatus of claim 1 wherein said second plurality of modules comprises a display modulator module.

5. The apparatus of claim 1 wherein said compressed input control module comprises a decompression engine and a bitstream engine.

6. The apparatus of claim 1 wherein said image reconstruction module comprises a motion estimator.

7. The apparatus of claim 6 wherein said image reconstruction module produces image motion information for use by said DOP.

8. The apparatus of claim 1 wherein said bitstream engine tracks block information for use by said DOP.

9. The apparatus of claim 1 comprising an image modulator coupled to said DOP.

10. A method for providing video stream image data to a display device, comprising:

receiving bitstream information into a display input processor (DIP);

directing said bitstream information to a compressed input control module within said DIP;

processing said bitstream information with a decompression engine to create decompressed bitstream data that retains at least some frame information from the compressed bitstream;

processing said decompressed bitstream information with a bitstream engine using the retained frame information to create enhanced video frame information; and directing said enhanced video frame information to a display output processor (DOP), said DOP for providing video stream image data to said display device.

11. The method of claim 10 comprising using said compressed input control module for de-multiplexing said bitstream information into audio, video and system data streams prior to the decompressing.

12. The method of claim 11 comprising directing said audio stream to an audio subsystem for decoding and playback.

13. The method of claim 10 where creating decompressed bitstream data comprises retaining I-frame information and at least some B-frame and P-frame information from multiple Groups of Pictures (GOPs) within said compressed bitstream information.

14. The method of claim 10 where creating enhanced video stream information with said bitstream engine comprises:

preserving Discrete Cosine Transform (DCT) frequency domain information and spatial domain information across multiple input frames; and using said preserved DCT and spatial domain information to track and recognize video image flow.

15. The method of claim 10 where creating enhanced video stream information with said bitstream engine comprises:

constructing a post decompression filter map; and using said post-decompression filter map for applying sharpening filters to non-boundary data and smoothing filters to block boundary data.

16. The method of claim 10 comprising:

retrieving supplemental information from the bitstream information using an enhanced decoder; and using said retrieved supplemental information for tracking image flow and estimating object motion over a period of time.

17. The method of claim 16 wherein said DOP providing video stream image data to said display device comprises using the flow of video data information for producing output frames having higher resolution than each output frame's respective input frame.

18. The method of claim 16 wherein retrieving supplemental information using said enhanced decoder comprises retrieving an image key meta data stream.

19. The method of claim 18 comprising recording image key information within said enhanced video stream for output to said DOP.

20. The method of claim 19 comprising employing said image key information to replace a first object within said enhanced video stream with a second object.

21. The method of claim 20 wherein tracking a flow of video data comprises:

tracking the prediction blocks such that a temporal path of the prediction blocks delineates a coarse trajectory of moving objects; and processing the coarse trajectory with the bitstream engine to create a motion vector.

22. The method of claim 10 wherein processing said decompressed bitstream information with a bitstream engine comprises:

retaining image block information;

using block-based prediction techniques to compare a first frame to a second frame; and tracking a flow of video data within said decompressed bitstream information as prescribed by the prediction blocks.

23. A method for generating video stream image data directed to a display device, comprising:

receiving bitstream information into a display input processor (DIP);

processing said bitstream information to output enhanced video frame information;

directing the enhanced video frame information to a display output processor (DOP);

processing the enhanced video frame information with a geometric transformation (GT) module to generate compensated digital image data;

filtering the compensated image data with a post GT filtering module to produce DOP output data; and providing the DOP output data to said display device.

24. The method of claim 23 wherein providing the DOP output data to said display system comprises directing the output data to an image modulator intermediate said DOP and said display device.

25. The method of claim 24 comprising storing data corresponding to said image modulator that is characteristic of said display device at chosen pixel or screen locations.

26. The method of claim 24 wherein generating the compensated digital image data comprises providing the compensated digital image data to a frame buffer memory.

27. The method of claim 26 wherein filtering the compensated digital image data comprises retrieving the data from said frame buffer memory.

28. The method of claim 24 wherein generating the compensated digital image data comprises adjusting neighboring pixel values.

29. The method of claim 24 wherein filtering the compensated digital image data comprises retrieving the data from said frame buffer memory.

30. A method for generating enhanced video stream images, comprising:

receiving compressed bitstream information into a display input processor (DIP);

directing said bitstream information to a compressed input control module within said DIP;

processing said bitstream information into a decompressed bitstream and a supplemental data bitstream;

creating enhanced video stream information using the decompressed bitstream and the supplemental information;

providing the enhanced video stream information to a display output processor (DOP);

processing the enhanced video frame information with a geometric transformation (GT) module to generate compensated digital image data;

filtering the compensated image data with a post GT filtering module to produce DOP output data; and providing the DOP output data to said display device whereby enhanced video stream images are displayed.

* * * * *

UNITED STATES PATENT AND TRADEMARK OFFICE
CERTIFICATE OF CORRECTION

PATENT NO. : 6,157,396
DATED : December 5, 2000
INVENTOR(S) : Neal Margulis et al.

It is certified that error appears in the above-identified patent and that said Letters Patent is hereby corrected as shown below:

Col. 15, line 46
 replace "graphs"
 with --graphics--.

Col. 19, line 17
 replace "form"
 with --from--.

Col. 20, line 33
 replace "from"
 with --frame--.

Col. 22, line 65
 replace "filter"
 with --filtering--.

Col. 23, line 41
 replace "415"
 with --515--.

Signed and Sealed this

Eighth Day of May, 2001

*Attest:*

NICHOLAS P. GODICI

*Attesting Officer*   Acting Director of the United States Patent and Trademark Office